(12) United States Patent
Asami

(10) Patent No.: US 11,864,297 B2
(45) Date of Patent: Jan. 2, 2024

(54) HEATING COOKING APPARATUS

(71) Applicant: SHARP KABUSHIKI KAISHA, Sakai (JP)

(72) Inventor: Shinji Asami, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 347 days.

(21) Appl. No.: 16/950,344

(22) Filed: Nov. 17, 2020

(65) Prior Publication Data

US 2021/0204371 A1 Jul. 1, 2021

(30) Foreign Application Priority Data

Dec. 25, 2019 (JP) ................................. 2019-234462

(51) Int. Cl.
*H05B 6/64* (2006.01)
*F24C 15/32* (2006.01)
(Continued)

(52) U.S. Cl.
CPC ............ *H05B 6/6485* (2013.01); *A47J 36/32* (2013.01); *A47J 37/0641* (2013.01); *A47J 37/0664* (2013.01); *F24C 7/067* (2013.01); *F24C 7/085* (2013.01); *F24C 15/168* (2013.01); *F24C 15/322* (2013.01)

(58) Field of Classification Search
None
See application file for complete search history.

(56) References Cited

U.S. PATENT DOCUMENTS 8,253,084 B2  8/2012  Toyoda et al.
10,154,549 B2  12/2018  Nasu et al.
(Continued)

FOREIGN PATENT DOCUMENTS

CA    2940468 C  *  3/2016  ................ F24C 1/00
DE    102018201743 A1  *  8/2019  ............. F24C 7/085
(Continued)

OTHER PUBLICATIONS

Machine translation of WO 2015118868 A1 performed on Nov. 9, 2022, Hayashi et al. (Year: 2015).*
(Continued)

*Primary Examiner* — Dana Ross
*Assistant Examiner* — Kevin Guanhua Wen
(74) *Attorney, Agent, or Firm* — ScienBiziP, P.C.

(57) ABSTRACT

A heating cooking apparatus includes a heating chamber, a main body outer case, a fan, a first duct member, and an air sending unit. The fan is disposed in a first space. The first space is formed between an outer surface of the heating chamber and an inner surface of the main body outer case. The first duct member is attached to the outer surface of the heating chamber. The first duct member separates a blown air flow into a first air flow and a second air flow. The first air flow flows inside the first duct member. The second air flow flows outside the first duct member. The air sending unit includes an air sending chamber and a heater. The heater is located in the air sending chamber. The air sending chamber is disposed at a position where the air sending chamber is exposed to the first air flow and is not exposed to the second air flow.

7 Claims, 21 Drawing Sheets

(51) Int. Cl.
*F24C 7/08* (2006.01)
*A47J 37/06* (2006.01)
*F24C 7/06* (2006.01)
*A47J 36/32* (2006.01)
*F24C 15/16* (2006.01)

(56) References Cited

U.S. PATENT DOCUMENTS

| | | |
|---|---|---|
| 2010/0133263 A1 | 6/2010 | Toyoda et al. |
| 2012/0187115 A1 | 7/2012 | Toyoda et al. |
| 2012/0192725 A1 | 8/2012 | Toyoda et al. |
| 2017/0171921 A1 | 6/2017 | Nasu et al. |

FOREIGN PATENT DOCUMENTS

| | | | | |
|---|---|---|---|---|
| EP | 1640667 A1 | | 3/2006 | |
| EP | 3348914 A1 | * | 7/2018 | .............. F24C 15/32 |
| JP | 2005003319 A | | 1/2005 | |
| JP | 2009293820 A | | 12/2009 | |
| JP | 2010-133634 A | | 6/2010 | |
| JP | 2014059128 A | | 4/2014 | |
| JP | 2016056968 A | | 4/2016 | |
| KR | 100767043 B1 | * | 10/2007 | ............ F24C 15/006 |
| KR | 100807384 B1 | * | 2/2008 | .............. F24C 15/20 |
| WO | WO 2010013650 A1 | * | 2/2010 | ............ F24C 15/322 |
| WO | WO 2015118868 A1 | * | 8/2015 | .............. H05B 6/707 |

OTHER PUBLICATIONS

Machine translation of DE 102018201743 A1 performed on Nov. 9, 2022, Wild et al. (Year: 2019).*
Machine translation of KR 100807384 B1 performed on Nov. 9, 2022, Bae (Year: 2008).*
Machine translation of WO 2010013650 A1 performed on Nov. 9, 2022, Yoshimura et al. (Year: 2010).*
Machine translation of KR 100767043 B1 performed on Apr. 6, 2023, Jun et al. (Year: 2007).*

* cited by examiner

HEATING COOKING APPARATUS

CROSS-REFERENCE TO RELATED APPLICATIONS

This application claims the benefit of priority to Japanese Patent Application Number 2019-234462 filed on Dec. 25, 2019. The entire contents of the above-identified application are hereby incorporated by reference.

BACKGROUND

Technical Field

The present disclosure relates to a heating cooking apparatus.

A known heating cooking apparatus includes a heating chamber and a drawer body. The heating chamber includes a heating cooking chamber. The drawer body is integrally formed with an opening/closing door. The drawer body is disposed such that the drawer body can be drawn out from the heating cooking chamber. Such a heating cooking apparatus as described above is incorporated into a cabinet of a built-in kitchen.

JP 2010-133634 A discloses a heating cooking apparatus. Heating functions of the heating cooking apparatus disclosed in JP 2010-133634 A include a microwave heating function and a rapid hot air heating function. The microwave heating function is a function of applying microwaves toward an object to be heated. The rapid hot air heating function is a function of rapidly blowing out hot air toward an object to be heated.

SUMMARY

However, in the heating cooking apparatus disclosed in JP 2010-133634 A, when the rapid hot air heating function is used, an outer surface of the heating chamber may increase in temperature along with the increase in temperature in the heating chamber. With this, the temperature around the outer surface of the heating chamber may be increased. Electrical components, functional components, and structural components are disposed around the outer surface of the heating chamber. Thus, the temperature of the components disposed around the outer surface of the heating chamber may increase.

In light of the problems described above, the present disclosure has an object to provide a heating cooking apparatus capable of efficiently cooling components disposed around an outer surface of a heating chamber.

A heating cooking apparatus according to the present disclosure includes a heating chamber, a main body outer case, a fan, a first duct member, and an air sending unit. The heating chamber internally includes a heating cooking chamber in which an object to be heated is accommodated. The main body outer case accommodates the heating chamber. The fan is disposed in a first space. The first space is formed between an outer surface of the heating chamber and an inner surface of the main body outer case. The first duct member is attached to the outer surface of the heating chamber. The air sending unit supplies hot air into the heating cooking chamber. The first duct member separates blown air flow blown out from the fan into a first air flow and a second air flow. The first air flow is air flow of the blown air flow that flows through the inside of the first duct member. The second air flow is air flow of the blown air flow that flows through the outside of the first duct member. The air sending unit includes an air sending chamber and a heater. The heater is located in the air sending chamber. The heater heats air. The air sending chamber is disposed at a position where the air sending chamber is exposed to the first air flow and is not exposed to the second air flow.

According to the heating cooking apparatus of the present disclosure, components disposed around the outer surface of the heating chamber can be efficiently cooled.

BRIEF DESCRIPTION OF DRAWINGS

The disclosure will be described with reference to the accompanying drawings, wherein like numbers reference like elements.

DESCRIPTION OF EMBODIMENTS

Figure 1A:
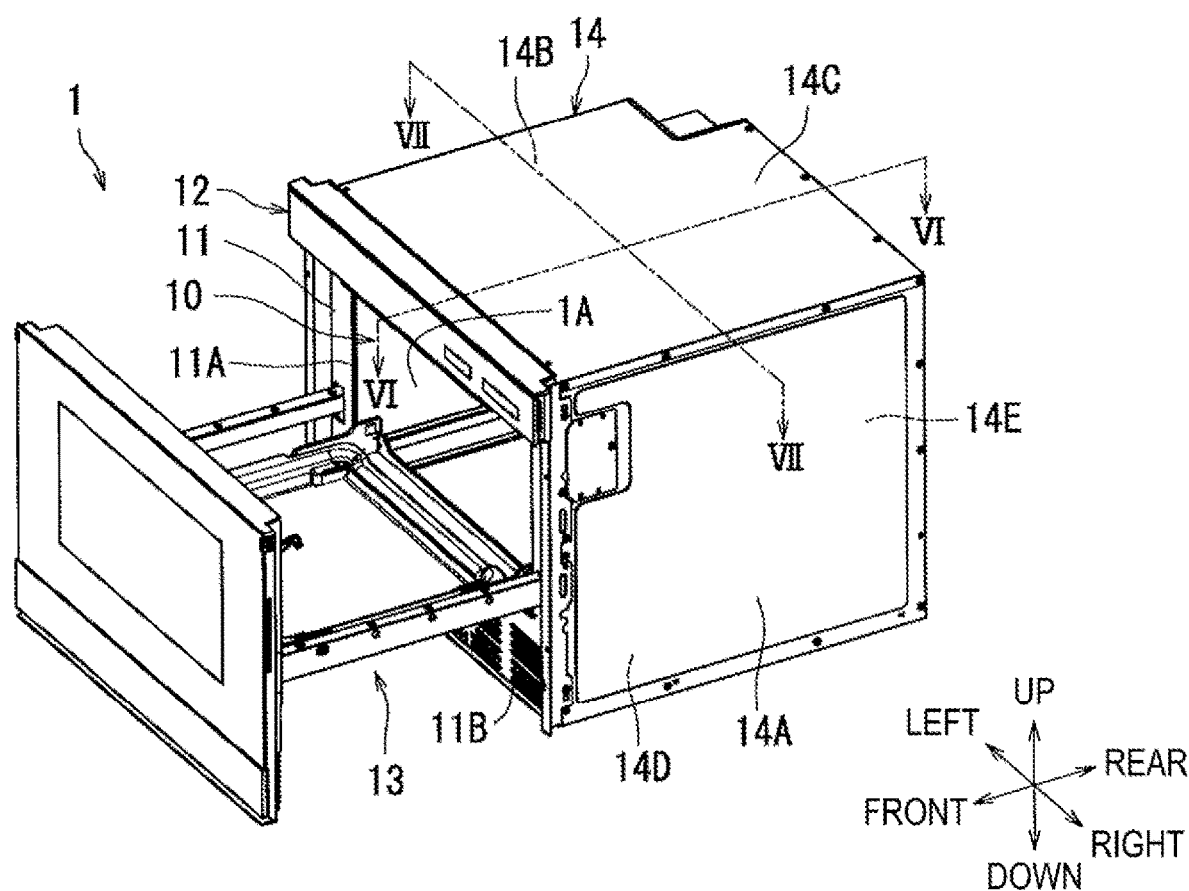
FIG. 1A is a perspective view of a heating cooking apparatus according to an embodiment of the present disclosure.

An embodiment of a heating cooking apparatus according to the present disclosure will be described below with reference to the drawings. Note that, in the drawings, the same or equivalent components are denoted by the same reference signs and description thereof will not be repeated.

Figure 1B:
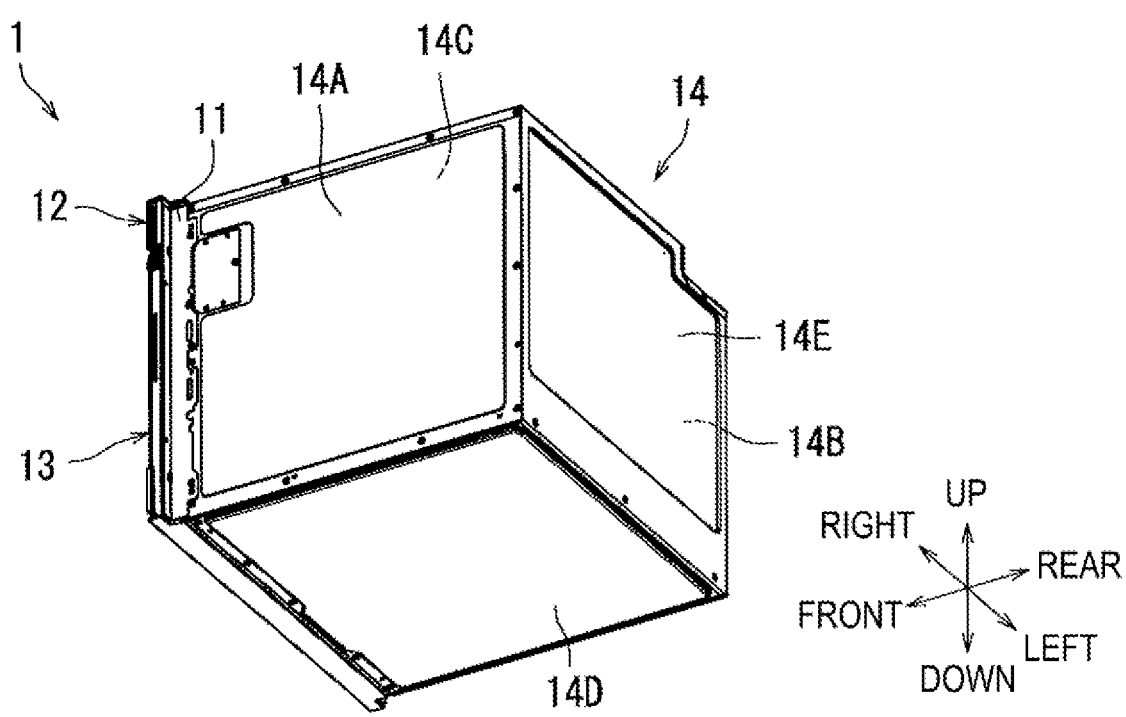
FIG. 1B is a perspective view of the heating cooking apparatus according to the embodiment of the present disclosure.

With reference to FIGS. 1A and 1B, a heating cooking apparatus 1 according to the present embodiment will be described. FIGS. 1A and 1B are each a perspective view of the heating cooking apparatus 1 according to the present embodiment. More specifically, FIG. 1A illustrates the heating cooking apparatus 1 as viewed diagonally from an upper right side in front. FIG. 1B illustrates the heating cooking apparatus 1 as viewed diagonally from a lower right side from behind.

The heating cooking apparatus 1 is used to heat and cook an object to be heated. The object to be heated is, for example, food. As illustrated in FIG. 1A, the heating cooking apparatus 1 includes a heating chamber 10, a panel 11, an operation panel part 12, a drawer body 13, and a main body outer case 14.

In the present embodiment, a side on which the operation panel part 12 of the heating cooking apparatus 1 is disposed is defined as a "front side", and a side opposite thereto is defined as a "rear side". Further, a right side as viewed from the front side of the heating cooking apparatus 1 is defined as a "right side", and a side opposite thereto is defined as a "left side". Further, a side on which the operation panel part 12 is disposed in a direction orthogonal to a front-and-rear direction and a right-and-left direction of the heating cooking apparatus is defined as an "upper side", and a side opposite thereto is defined as a "lower side". Note that these directions are not intended to limit the directions of the heating cooking apparatus according to the present disclosure when the heating cooking apparatus is used.

The heating chamber 10 has a bow-like shape. The heating chamber 10 internally includes a heating cooking chamber 1A. The heating cooking chamber 1A accommodates the object to be heated.

In the present embodiment, the heating cooking apparatus 1 includes, as heating cooking modes, a microwave heating mode, a first hot air circulation heating mode, a second hot air circulation heating mode, and a grill heating mode. The microwave heating mode is mainly a mode in which the object to be heated is heated and cooked through radiation of microwaves in the heating cooking chamber 1A. The first hot air circulation heating mode is mainly a mode in which the object be heated is heated and cooked by circulating a first hot air H1 in the heating cooking chamber 1A. The second hot air circulation heating mode mainly includes a first mode and a second mode. The first mode is a mode in which the object to be heated is heated and cooked by directly blowing a second hot air H2 onto an upper surface of the object to be heated. The second mode is a mode in which the inside of the heating cooking chamber is preheated in a short period of time by circulating the second hot air H2 in the heating cooking chamber 1A. The grill heating mode is mainly a mode in which the object to be heated is heated and cooked by exposing the object to be heated to thermal radiation.

The panel 11 is disposed on the front side of the heating chamber 10. The panel 11 includes an opening part 11A. The opening part 11A is located at a substantially center portion of the panel 11. The opening part 11A has a rectangular shape. The opening part 11A communicates with the heating cooking chamber 1A. Details of the panel 11 will be described later with reference to FIG. 5.

The operation panel part 12 receives operation from a user. The operation panel part 12 is disposed further forward than the panel 11. In other words, the operation panel part 12 is disposed in front of the heating chamber 10. The operation panel part 12 is located at an upper portion of the heating cooking apparatus 1. Details of the configuration of the operation panel part 12 will be described later with reference to FIG. 13.

The drawer body 13 is freely drawable in the front-and-rear direction with respect to the heating chamber 10. More specifically, the drawer body 13 is drawn out toward the front side of the heating chamber 10. The drawer body 13 is located on the lower side of the operation panel part 12. Details of the configuration of the drawer body 13 will be described later with reference to FIG. 2 and FIG. 3.

The main body outer case 14 accommodates the heating chamber 10. The main body outer case 14 is an object having a rectangular parallelepiped shape with an open front side. As illustrated in FIG. 1B, the main body outer case 14 includes a right wall 14A, a left wall 14B, an upper wall 14C, a lower wall 14C, and a rear wall 14E.

Figure 2:
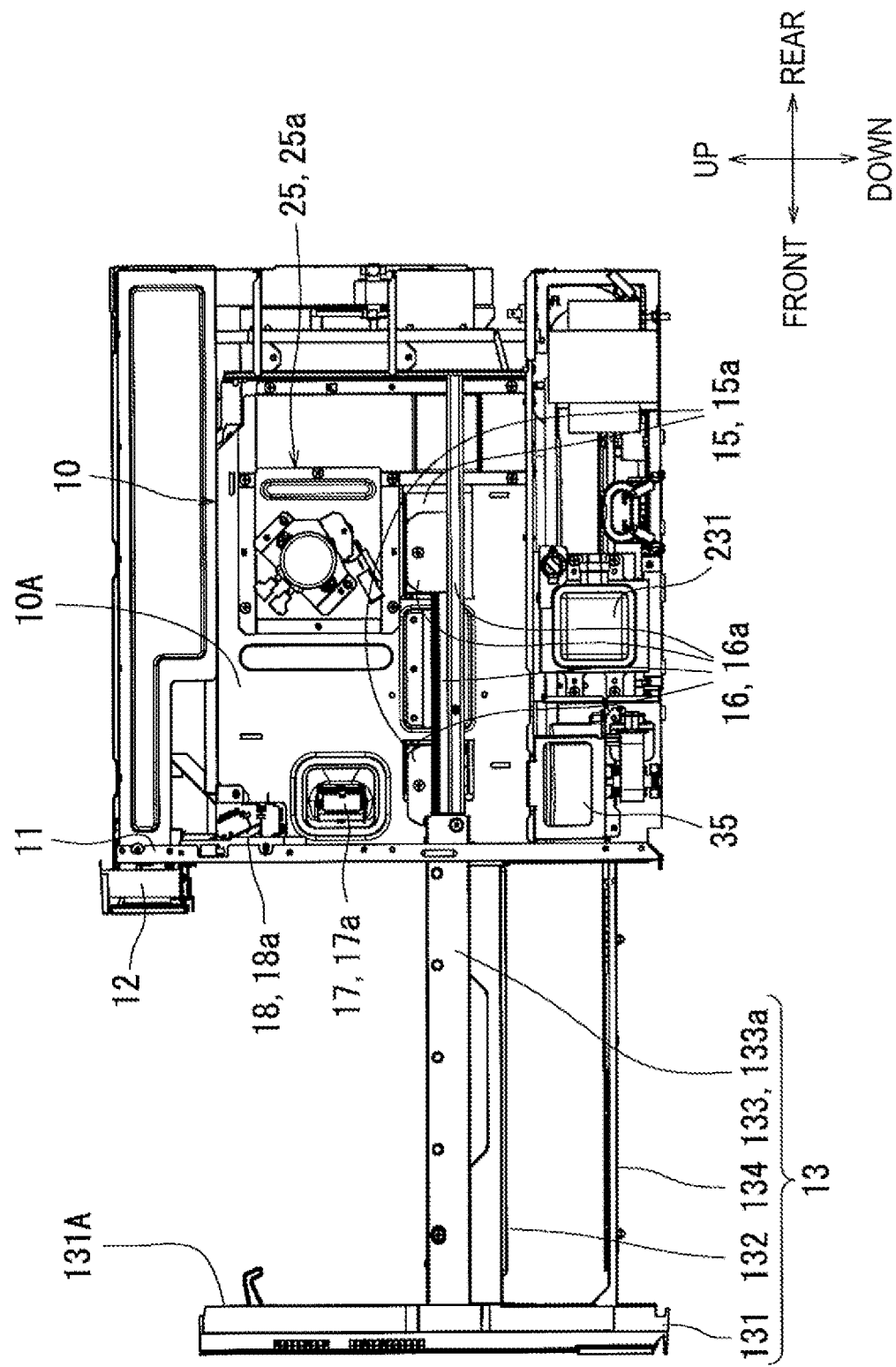
FIG. 2 is a diagram illustrating a right side surface of the heating cooking apparatus according to the embodiment of the present disclosure.
Figure 3:
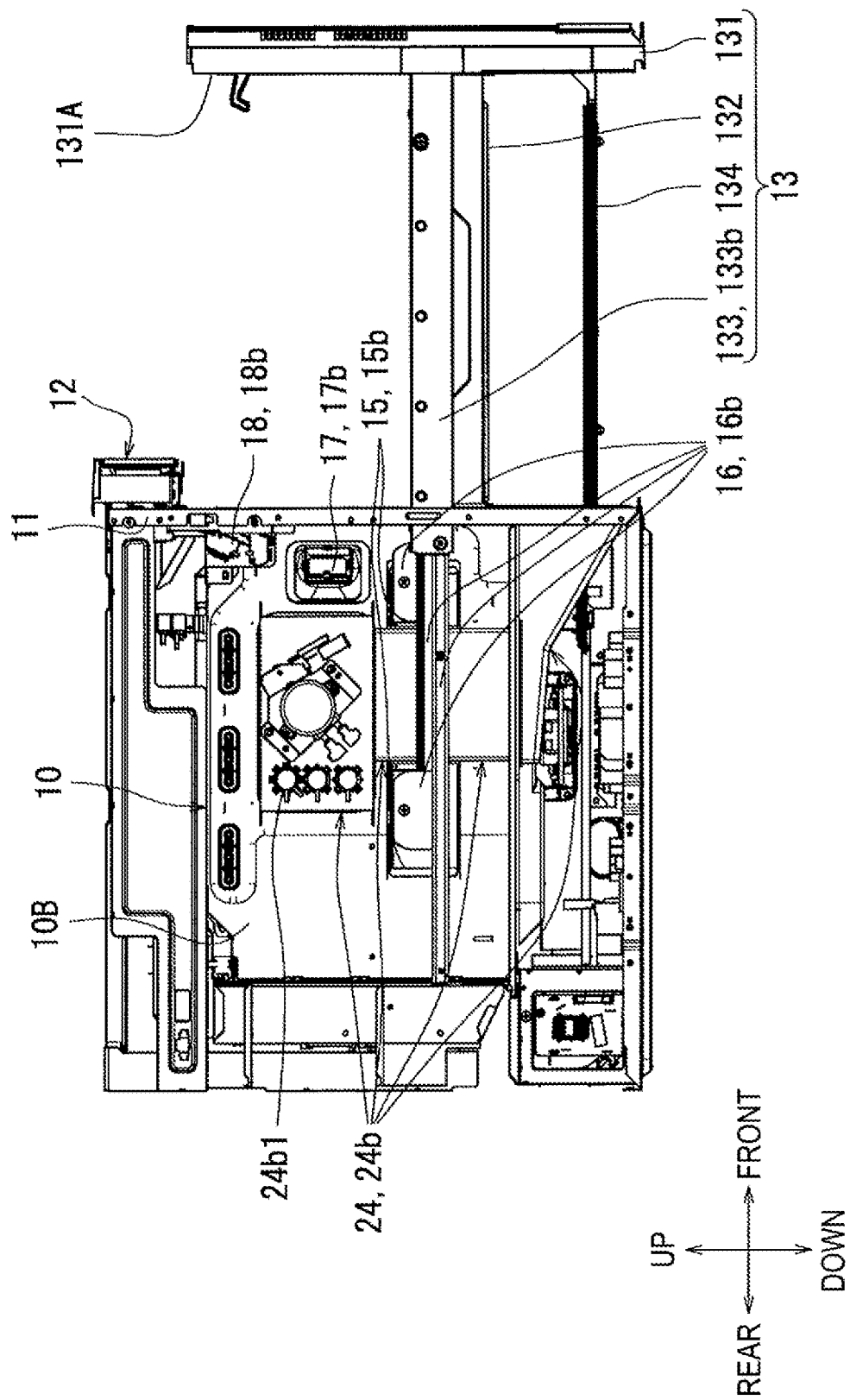
FIG. 3 is a diagram illustrating a left side surface of the heating cooking apparatus according to the embodiment of the present disclosure.
Figure 4:
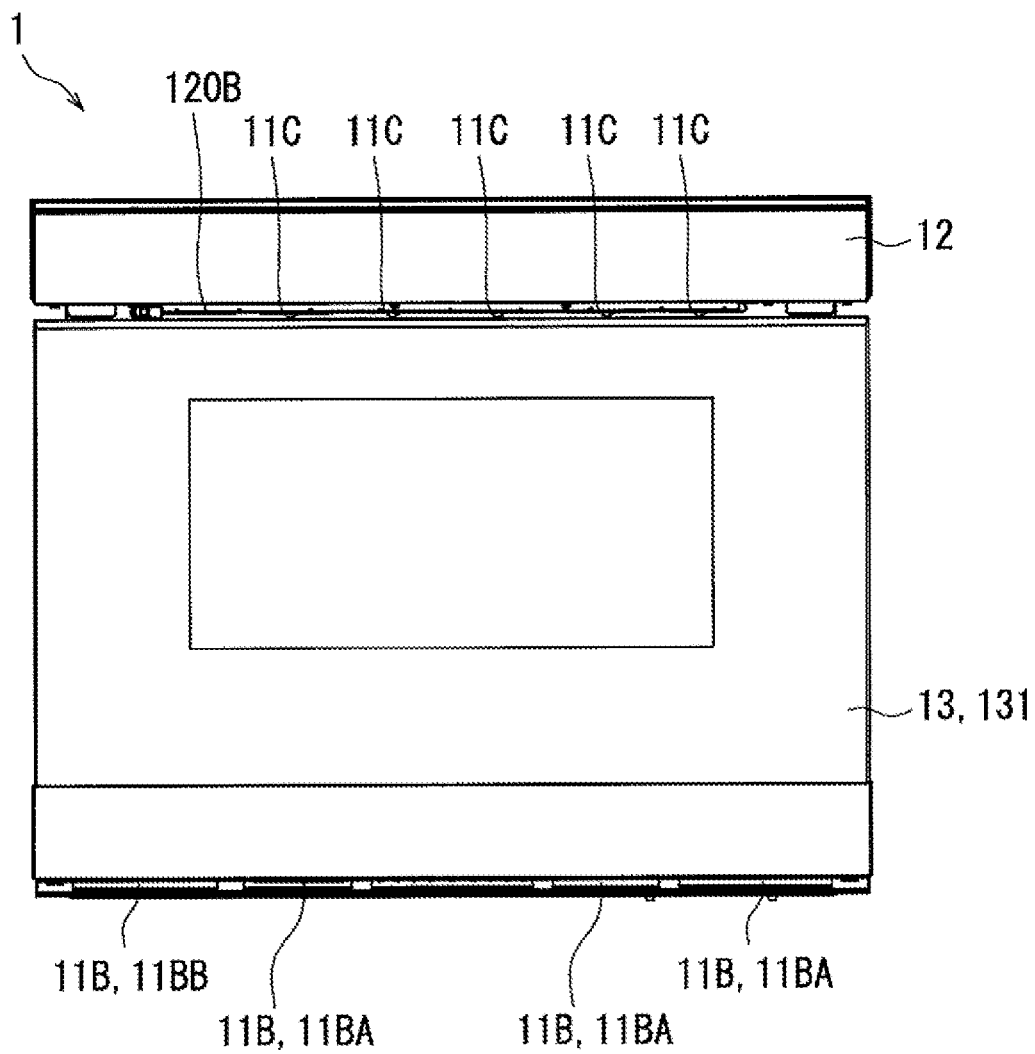
FIG. 4 is a front view of the heating cooking apparatus according to the embodiment of the present disclosure.

Next, with reference to FIG. 1A to FIG. 4, the drawer body 13 will be described in further detail. FIG. 2 is a diagram illustrating a right side surface of the heating cooking apparatus 1 according to the present embodiment. More specifically, FIG. 2 illustrates the right side surface of the heating cooking apparatus 1 in a state in which the main body outer case 14 is removed. FIG. 3 is a diagram illustrating a left side surface of the heating cooking apparatus 1 according to the present embodiment. More specifically, FIG. 3 illustrates the left side surface of the heating cooking apparatus 1 in a state in which the main body outer case 14 is removed. FIG. 4 is a front view of the heating cooking apparatus 1 according to the present embodiment.

As illustrated in FIG. 2 and FIG. 3, the drawer body 13 includes a door part 131, a placement part 132, a pair of right and left slide members 133, and a support member 134. The pair of right and left slide members 133 is an example of "slide member".

The door part 131 is capable of opening and closing the opening part 11A of the panel 11. As illustrated in FIG. 4, the door part 131 is a member having a substantially rectangular plate-like shape.

The object to be heated can be placed on the placement part 132. As illustrated in FIG. 2 and FIG. 3, the door part 131 includes a rear surface 131A. The placement part 132 is attached to the rear surface 131A of the door part 131.

The pair of right and left slide members 133 supports the door part 131. The pair of right and left slide members 133 supports the placement part 132 by supporting the door part 131. The pair of right and left slide members 133 is attached to the rear surface 131A of the door part 131. The pair of right and left slide members 133 includes a right-side slide member 133a (see FIG. 2) having a longitudinal direction corresponding to the front-and-rear direction, and a left-side slide member 133b (see FIG. 3) having a longitudinal direction corresponding to the front-and-rear direction.

The support member 134 supports the door part 131. The support member 134 supports the placement part 132 by supporting the door part 131. The support member 134 is attached at a substantially center portion of the rear surface 131 of the door part 131 in the right-and-left direction and on a side lower than the placement part 132. The support member 134 is a member having a plate-like shape with its longitudinal direction corresponding to the front-and-rear direction. The support member 134 includes a rack part. The rack part includes a plurality of teeth. The heating cooking apparatus 1 includes a drive mechanism 26 to be described later with reference to FIG. 14. The drive mechanism 26 is accommodated in an air intake space AR to be described later with reference to FIG. 9. By being engaged with the rack part of the support member 134, the drive mechanism 26 causes the drawer body 13 to be in an opened state or a closed state. The opened state of the drawer body 13 refers to a state in which the placement cart 132 of the drawer body 13 is drawn out from the heating cooking chamber 2A. The closed state of the drawer body 13 refers to a state in which the placement part 132 of the drawer 13 is drawn into the heating cooking chamber 1A.

Figure 5:
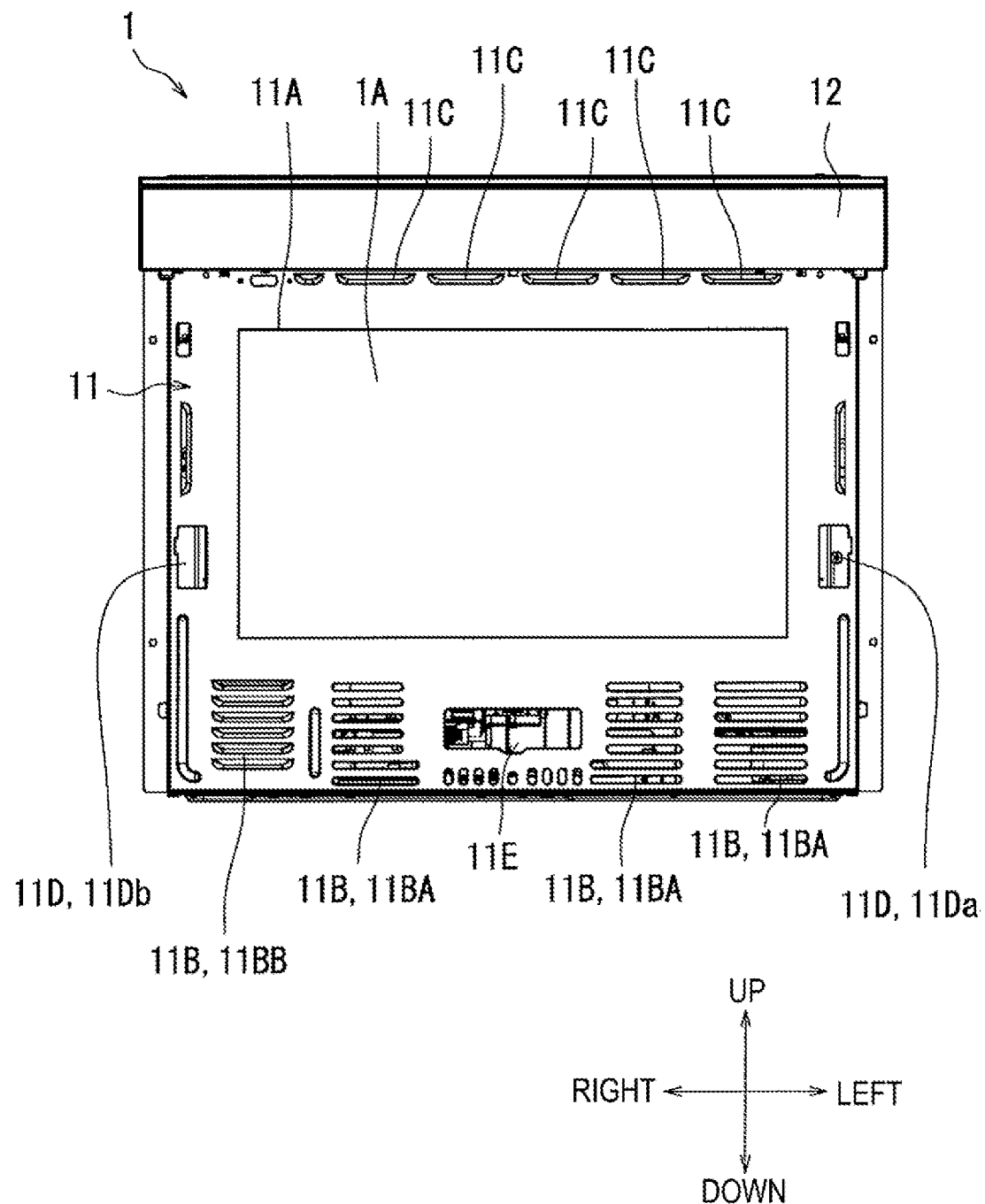
FIG. 5 is a front view of the heating cooking apparatus according to the embodiment of the present disclosure.

Next, the panel 11 will be described in further detail with reference to FIG. 1A to FIG. 5. FIG. 5 is a front view of the heating cooking apparatus 1 according to the present embodiment. More specifically, FIG. 5 illustrates the heating cooking apparatus 1 in a state in which the drawer body 13 is removed. Note that, in FIG. 5, an air discharge hole part 120B to be described later with reference to FIG. 3 is omitted.

As illustrated in FIG. 5, the panel 11 is a rectangle member having a plate-like shape. The panel 11 includes, in addition to the opening part 11A, a plurality of first through hole darts 11B, a plurality of second through hole parts 11C, a pair of third through hole parts 11D, and a fourth through hole part 11E. The plurality of second through hole parts 11C are an example of a "through hole part". The plurality of second through hole parts 11C are hereinafter collectively referred to as an "exhaust hole part 110".

The plurality of first through hole parts 11B are located on a side portion lower than the opening part 11A of the panel 11. The plurality of first through hole parts 11B form four rows. In the present embodiment, in each single row of the four rows, six or seven first through hole parts 11B are disposed in a row along an up-and-down direction. Two rows of the four rows are located on a right side portion of the panel 11. The other two rows of the four rows are located on a left side portion of the panel 11. The seven first through hole parts 11B constituting each one of the rows except the row located on the leftmost side out of the four rows may be hereinafter collectively referred to as an "air intake hole part 11BA". The six first through hole parts 11B constituting the row located on the leftmost side out of the four rows may be hereinafter collectively referred to as an "exhaust hole part 11BB". The air intake hole parts 11BA communicate a first space R to be described later with reference to FIG. 9 and the outside of the heating cooking apparatus 1 with each other. The air intake hole parts 11BA are located upstream of a blown air flow BF that is blown out by a cooling fan 30 to be described later with reference to FIG. 9.

The exhaust hole parts 11C communicate the first space R to be described later with reference to FIG. 9 and the outside of the heating cooking apparatus 1 with each other. The exhaust hole parts 11C are located downstream of the blown air flow BF that is blown out by the cooling fan 30 to be described later with reference to FIG. 9. Further, the exhaust hole parts 11C are located on an upper side portion higher than the opening part 11A of the panel 11. The exhaust hole parts 11C are disposed in a row from a right portion to a left portion of the panel 11. Further, as illustrated in FIG. 4, the exhaust hole parts 11C are located between the drawer body 13 and the operation panel part 12 in the up-and-down direction.

As illustrated in FIG. 5, the pair of third through hole parts 11D include a right-side through hole part 11Da and a left-side through hole part 11Db. The right-side through hole part 11Da is located on a right side portion to the right of the opening part 11A of the panel 11. The left-side through hole part 11Db is located on a left side portion to the left of the opening part 11A of the panel 11. The right-side slide member 133a passes through the right-side through hole part 11Da of the panel 11. The left-side slide member 133b passes through the left-side through hole part 11Db of the panel 11.

The fourth through hole part 11E is located at a side portion lower than the opening part 11A of the panel 11 and at a substantially center portion of the opening part 11A in the right-and-left direction. The support member 134 passes through the fourth through hole part 11E of the panel 11.

Next, with reference to FIG. 1A to FIG. 5, the configuration of the heating cooking apparatus 1 will be described in further detail.

As illustrated in FIG. and FIG. 3, the heating cooking apparatus 1 further includes a pair of right and left support members 15, a pair of right and left slide rails 16, a pair of right and left in-chamber light components 17, and a pair of right and left latch switches 18.

The pair of right and left support members 15 supports the pair of right and left slide rails 16. The pair of right and left support members 15 includes a right side support member 15a (see FIG. 2) and a left-side support member 15b (see FIG. 3). As illustrated in FIG. 2, the heating chamber 10 includes a right wall 10A. The right-side support member 15a is attached to the right wall 10A of the heating chamber 10. As illustrated in FIG. 3, the heating chamber 10 includes a left wall 10B. The left-side support member 15b is attached to the left wall 10B of the heating chamber 10.

The pair of right and left slide rails 16 supports the drawer body 13 such that the drawer body 13 can freely slide in the front-and-rear direction. As illustrated in FIG. 2 and FIG. 3, the pair of right and left slide rails 16 includes a right-side slide rail 16a (see FIG. 2) and a left side slide rail 16b (see FIG. The right-side slide rail 16a and the left-side slide rail 16b are attached to an outer surface of the heating chamber 10. More specifically, as illustrated in FIG. 2, the right-side slide rail 16a is attached to the right-side support member 15a. As illustrated in FIG. 3, the left-side slide rail 16b is attached to the left side support member 15b. Each of the right-side slide rail 16a and the left-side slide rail 16b includes a portion having a plate-like shape with a longitudinal direction corresponding to the front-and-rear direction. The portion having a plate-like shape of the right-side slide rail 16a is engaged with the right-side slide member 133a. The right-side slide member 133a is supported so as to be freely slidable along the right-side slide rail 16a. The portion having a plate-like shape of the left-side slide rail 16b is engaged with the left-side slide member 133b. The left-side slide member 133b is supported so as to be freely slidable along the left-side slide rail 16b.

The pair of right and left in-chamber light components 17 lights up the inside of the heating cooking chamber 1A. As illustrated in FIG. 2 and FIG. 3, the pair of right and left in-chamber light components 17 includes a right-side in-chamber light component 17a (see FIG. 2) and a left-side in-chamber light component. 17b (see FIG. 3). As illustrated in FIG. 2, the right-side in-chamber light component 17a is attached to a front side portion of the right wall 10A of the heating chamber 10. As illustrated in FIG. 3, the left-side in-chamber light component 17b is attached to a front side portion of the left wall 10B of the heating chamber 10.

The pair of right and left latch switches 18 controls electric conduction for driving electrical components, based on the opened state or the closed state of the drawer body 13. More specifically, when the drawer body 13 is in the opened state, the pair of right and left latch switches 18 shuts off the electric conduction for driving the electrical components. When the drawer body 13 is in the closed state, the pair of right and left latch switches 18 does not shut off the electric conduction for driving the electrical components. The electrical components include a first air sending unit 21, a second air sending unit 22, a microwave supply unit 23, and a grill unit 24, which are to be described later with reference to FIG. 6 and FIG. 7.

As illustrated in FIG. 2 and FIG. 3, the pair of right and left latch switches 18 includes a right-side latch switch 18a (see FIG. 2) and a left-side latch switch 18b (see FIG. 3). As illustrated in FIG. 2, the right-side latch switch 18a is attached to a portion above the right-side in-chamber light component 17a out of the front side portion of the right wall 10A of the heating chamber 10. As illustrated in FIG. 3, the left-side latch switch 18b is attached to a portion above the left-side in-chamber light component 17b out of the front side portion of the left wall 10B of the heating chamber 10.

Figure 6:
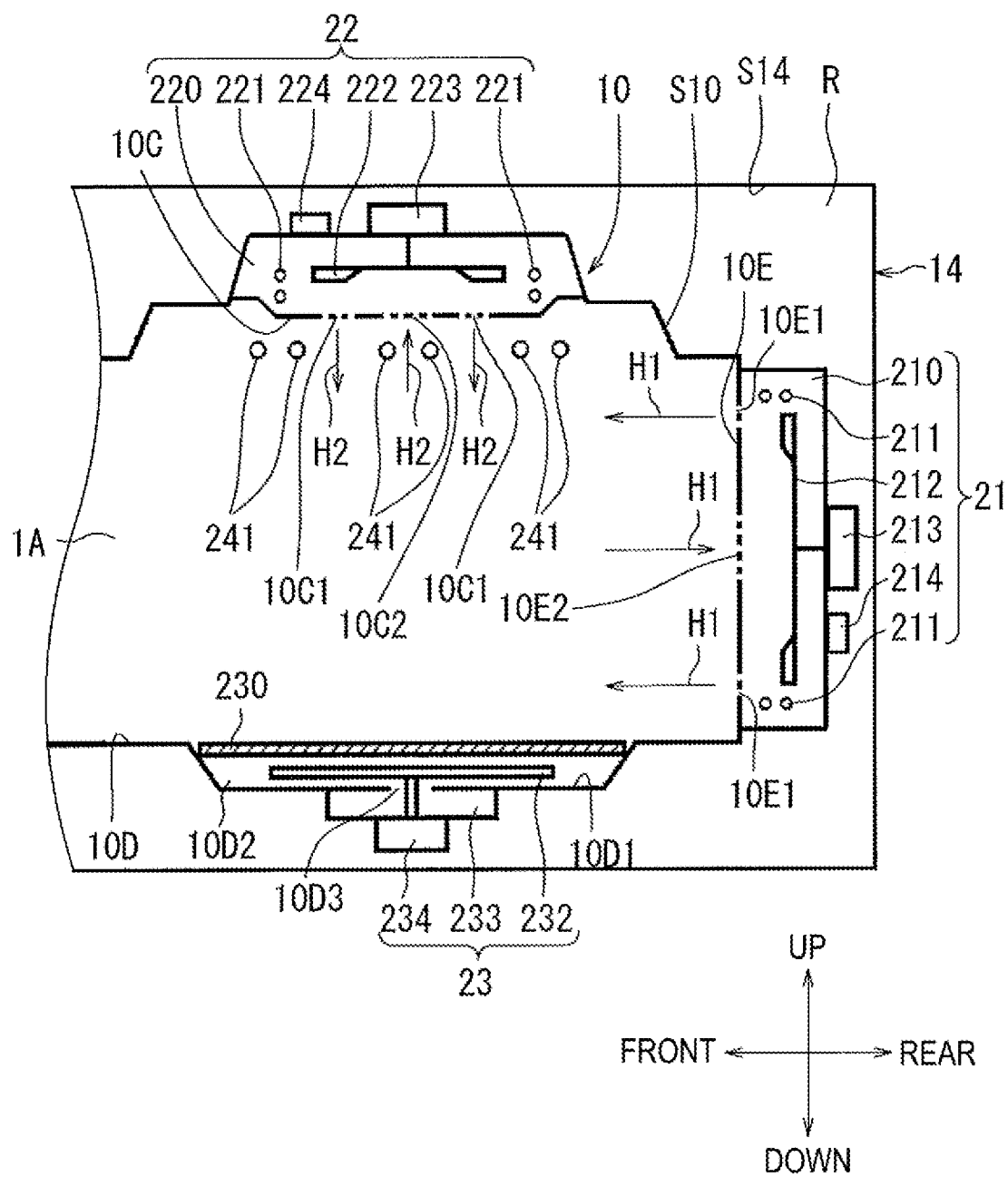
FIG. 6 is a cross-sectional diagram of the heating cooking apparatus taken along the section line VI in FIG. 1A.
Figure 7:
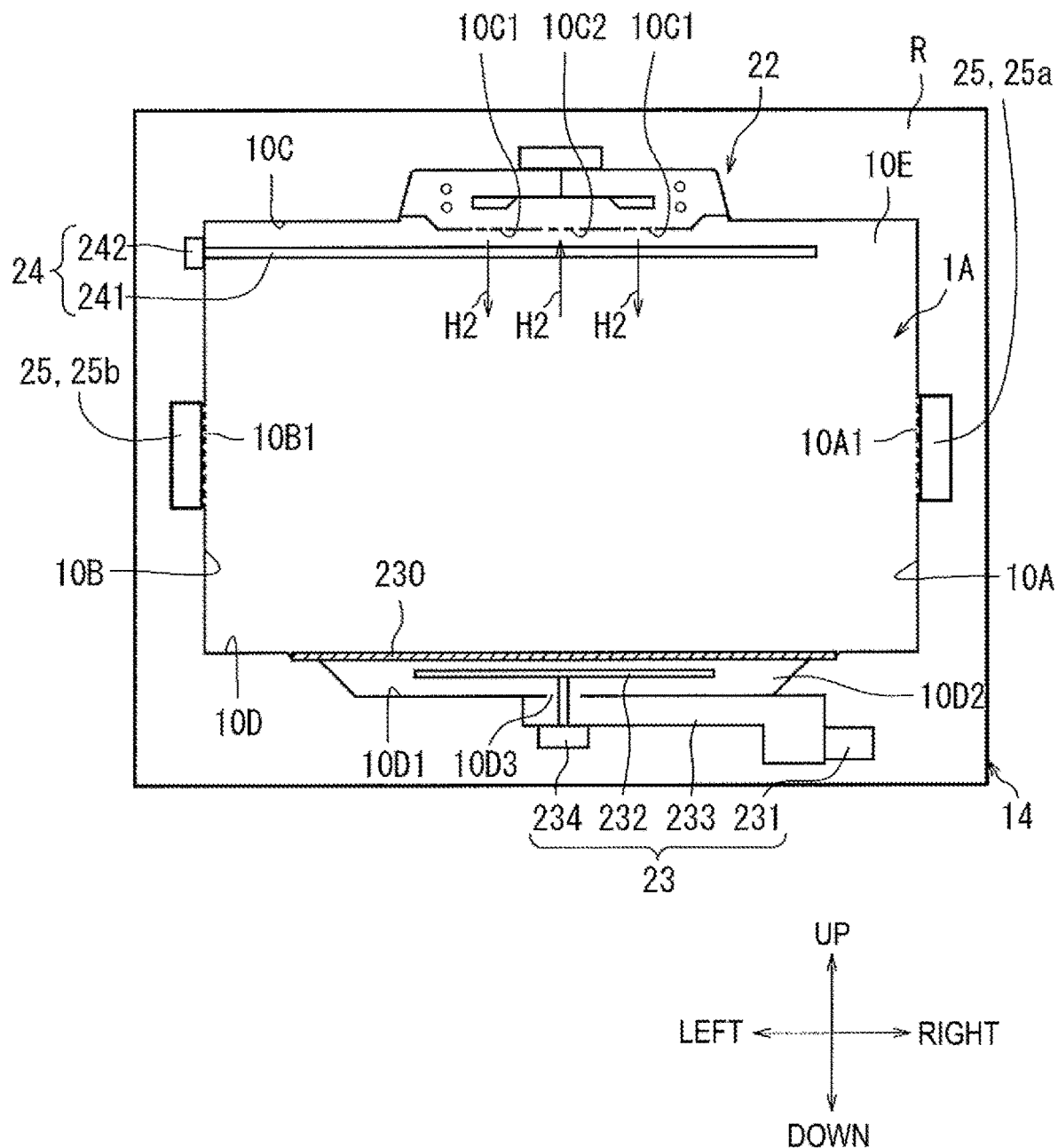
FIG. 7 is a cross-sectional diagram of the heating cooking apparatus taken along the section line VII in FIG. 1A.

Next, with reference to FIG. 1A to FIG. 7, the configuration of the heating cooking apparatus 1 according to the present embodiment will be described in further detail. FIG. 6 is a cross-sectional diagram of the heating cooking apparatus 1 taken along the section line VI in FIG. 1A. FIG. 7 is a cross-sectional diagram of the heating cooking apparatus 1 taken along the section line VII in FIG. 1A.

As illustrated in FIG. 6, the heating chamber 10 includes, in addition to the right wall 10A and the left wall 10E, an upper wall 100, a lower wall 10D, and a rear wall 10E. The heating cooking chamber 1A is formed by the right wall 10A, the left wall 10E, the upper wall 100, the lower wall 10D, and the rear wall. 10E. The heating cooking chamber 1A of the heating chamber 10 has a substantially rectangular parallelepiped shape.

The heating cooking apparatus 1 further includes a first air sending unit 21, a second air sending unit 22, a microwave supply unit 23, a grill unit 24 (see FIG. 7), and a damper unit 25 (see FIG. 7). The heating cooking apparatus 1 includes the first space R. The first space R is formed between an outer surface S10 of the heating chamber 10 and an inner surface S14 of the main body outer case 14.

The first air sending unit 21 supplies the first hot air H1 to the heating cooking chamber 1A. In other words, the first air sending unit 21 implements the first hot air circulation heating mode. The first air sending unit 21 is attached to an outer side of the rear wall 10E. The rear wall 10E includes a plurality of first blow out hole parts 10E1 and a plurality of first intake hole parts 10E2. The plurality of first intake hole parts 10E2 are located at a substantially center portion of the rear wall 10E. The plurality of first blow out hole parts 10E1 are located on an outer side portion of the plurality of first intake hole parts 10E2 in the rear wall 10E.

The first air sending unit 21 includes a first air sending chamber 210, a first heater 211, a first centrifugal fan 212, a first drive unit 213, and a first energization unit 214. The first heater 211 and the first centrifugal fan 212 are accommodated in the first air sending chamber 210. The first drive unit 213 and the first energization unit 4 are located on an outer side of the first air sending chamber 210. The first energization unit 214 energizes the first heater 211. The energized first heater 211 heats air in the first air sending chamber 210. The first drive unit 213 drives the first centrifugal fan 212. The driven first centrifugal fan 212 blows the air inside the first air sending chamber 210 into the heating cooking chamber 1A through the plurality of first blow out hole parts 10E1. Further, the driven first centrifugal fan 212 takes in the air inside the heating cooking chamber 1A into the first air sending chamber 210 through the plurality of first intake hole parts 10E2. The plurality of first intake hole parts 10E2 face the first centrifugal fan 212 in an axial direction of the first centrifugal fan 212. The first heater 211 is, for example, a sheathed heater. The first drive unit 213 is, for example, a motor. The energized first heater 211 generates heat. The temperature of the first air sending chamber 210 increases to a high temperature due to the drive of the first air sending unit 21.

The second air sending unit 22 supplies the second hot air H2 into the heating cooking chamber 1A. In other words, the second air sending unit 22 implements the second hot air circulation heating mode. The second air sending unit 22 is attached to an outer side of the upper wall 100. As illustrated in FIG. 7, the upper wall 100 includes a plurality of second blow out hole parts 1001 and a plurality of second intake hole parts 1002. The plurality of second blow out hole parts 1001 and the plurality of second intake hole parts 1002 are located at a substantially center portion of the upper wall 100.

As illustrated in FIG. 6, the second air sending unit 22 includes a second air sending chamber 220, a second heater 221, a second centrifugal fan 222, a second drive unit 223, and a second energization unit 224. The second heater 221 and the second centrifugal tan 222 are accommodated in the second air sending chamber 220. The second drive unit 223 and the second energization unit 224 are located on an outer side of the second air sending chamber 220. The second energization unit 224 energizes the second heater 221. The energized second heater 221 heats air in the second air sending chamber 220. The second drive unit 223 drives the second centrifugal fan 222. The driven second centrifugal fan 222 blows the air inside the second air sending chamber 220 into the heating cooking chamber 1A through the plurality of second blow out hole parts 1001. Further, the driven second centrifugal fan 222 takes in the air inside the heating cooking chamber 1A into the second air sending chamber 220 through the plurality of second intake hole parts 1022. The plurality of second intake hole parts 1002 face the second centrifugal fan 222 in an axial direction of the second centrifugal fan 222. The second heater 221 is, for example, a sheathed heater. The second drive unit 223 is, for example, a motor. The energized second heater 221 generates heat. The temperature of the second air sending chamber 220 increases to a high temperature due to the drive of the second air sending unit 22.

The microwave supply unit 23 supplies microwaves to the heating cooking chamber 1A. In other words, the microwave supply unit 23 implements the microwave heating mode. The microwave supply unit 23 is attached to the lower wall 100 side.

As illustrated in FIG. 7, the microwave supply unit 23 includes a magnetron 231, a rotary antenna 232, a waveguide 233, and an antenna motor 234. The lower wall 100 includes a recessed part 1001. The recessed part 1001 is located at a substantially center portion of the lower wall 100. The heating chamber 10 includes an oven tray 230. The oven tray 230 is attached to the lower wall 100. The oven tray 230 is a member having a plate-like shape. The oven tray 230 covers the recessed part 1001. The oven tray 230 and the recessed part 1001 form a space 1002 therebetween. The rotary antenna 232 is located in the space 1002. The magnetron 231, the waveguide 233, and the antenna motor 234 are located on an outer side of the recessed part 1001. The magnetron 231 generates microwaves. The recessed part 1001 includes a power supply hole part 1003. The waveguide 233 propagates the generated microwaves to the power supply hole part 10D3. As a result, the microwaves are supplied to the heating cooking chamber 1A via the rotary antenna 232. The antenna motor 234 drives the rotary antenna 232. The rotary antenna 232 agitates the microwaves and causes the microwaves to radiate in the heating cooking chamber 1A.

The material of the oven tray 230 includes ceramic or glass. Because the material of the oven tray 230 includes ceramic or glass, the oven tray 230 facilitates transmission of the microwaves. For this configuration, in the heating cooking apparatus 1, when the microwave heating mode is implemented, the microwaves can be supplied from the recessed part 10D1 side, so that the object to be heated can be efficiently heated and cooked.

The grill unit 24 supplies heat to the heating cooking chamber 1A. The grill unit 24 implements the grill heating mode. The grill unit 24 includes a heater unit for heating and cooking 241 and a third energization unit 242. The heater unit for heating and cooking 241 is located at an upper portion in the heating cooking chamber 1A. The third energization unit 242 is located on an outer side of the left wall 10B. The third energization unit 242 projects from an outer surface of the left wall 10B of the heating chamber 10. The third energization unit 242 energizes the heater unit for heating and cooking 241. The energized heater unit for heating and cooking 241 generates heat and radiates heat. The heater unit for heating and cooking 241 is, for example, a sheathed heater having a U-like shape. The third energization unit 242 of the grill unit 24 generates heat due to the drive of the grill unit 24.

As illustrated in FIG. 7, the right wall 10A includes a plurality of air supply hole parts 10A1. The plurality of air supply hole parts 10A1 penetrate the right wall 10A. The left wall 10B includes a plurality of exhaust hole parts 10B1. The plurality of exhaust hole parts 10B1 penetrate the left wall 10B.

The damper unit 25 opens or closes the openings of the plurality of air supply hole parts 10A1 and the plurality of exhaust hole harts 10B1. For example, when the damper unit 25 opens the openings of the plurality of air supply hole parts 10A1 and the plurality of exhaust hole harts 10B1, the heating cooking chamber 1A communicates with the first space R. When the damper unit 25 closes the openings of the plurality of air supply hole parts 10A1 and the plurality of exhaust hole parts 10B1, the heating cooking chamber 1A does not communicate with the first space R. The damper unit 25 includes an air supply damper 25a and an exhaust damper 25b.

The air supply damper 25a opens or closes the openings of the plurality of air supply hole parts 10A1. The air supply damper 25a is attached to an outer side of the right wall 10A.

The exhaust damper 25b opens or closes the openings of the plurality of exhaust hole parts 1081. The exhaust damper 25b is attached to an outer side of the left wall 10B. As illustrated in FIG. 3, the exhaust damper 25b includes a humidity sensor 25b1. The humidity sensor 25b1 detects the amount of vapor included in the air discharged from the heating cooking chamber 1A through the plurality of exhaust hole parts 10E1 when the plurality of exhaust hole parts 10E1 are opened. Accordingly, when the microwave heating mode is implemented, the heating cooking apparatus 1 can detect a finished state of the object to be heated that has been heated and cooked, based on the amount of vapor detected by the humidity sensor 25b1. The exhaust damper 25b guides the air discharged from the heating cooking chamber 1A through the exhaust hole parts 10E1 into the exhaust hole parts 11BB without coming into contact with the air in the first space R.

The temperature of the outer surface of the heating chamber 10 is liable to be a high temperature, as caused along with increase of the temperature in the heating cooking chamber 1A due to the drive of the first air sending unit 21, the second air sending unit 22, or the grill unit 24. The pair of right and left support members 15, the pair of right and left slide rails 16, and the pair of right and left slide members 133 are made of metal. The heat of the outer surface of the heating chamber 10 is liable to be thermally transferred to the pair of right and left support members 15, the pair of right and left slide rails 16, and the pair of right and left slide members 133. Thus, the temperature of the pair of right and left support members 15, the pair of right and left slide rails 16, and the pair of right and left slide members 133 increases to a high temperature, as caused along with increase of the temperature in the heating cooking chamber 1A.

Figure 8:
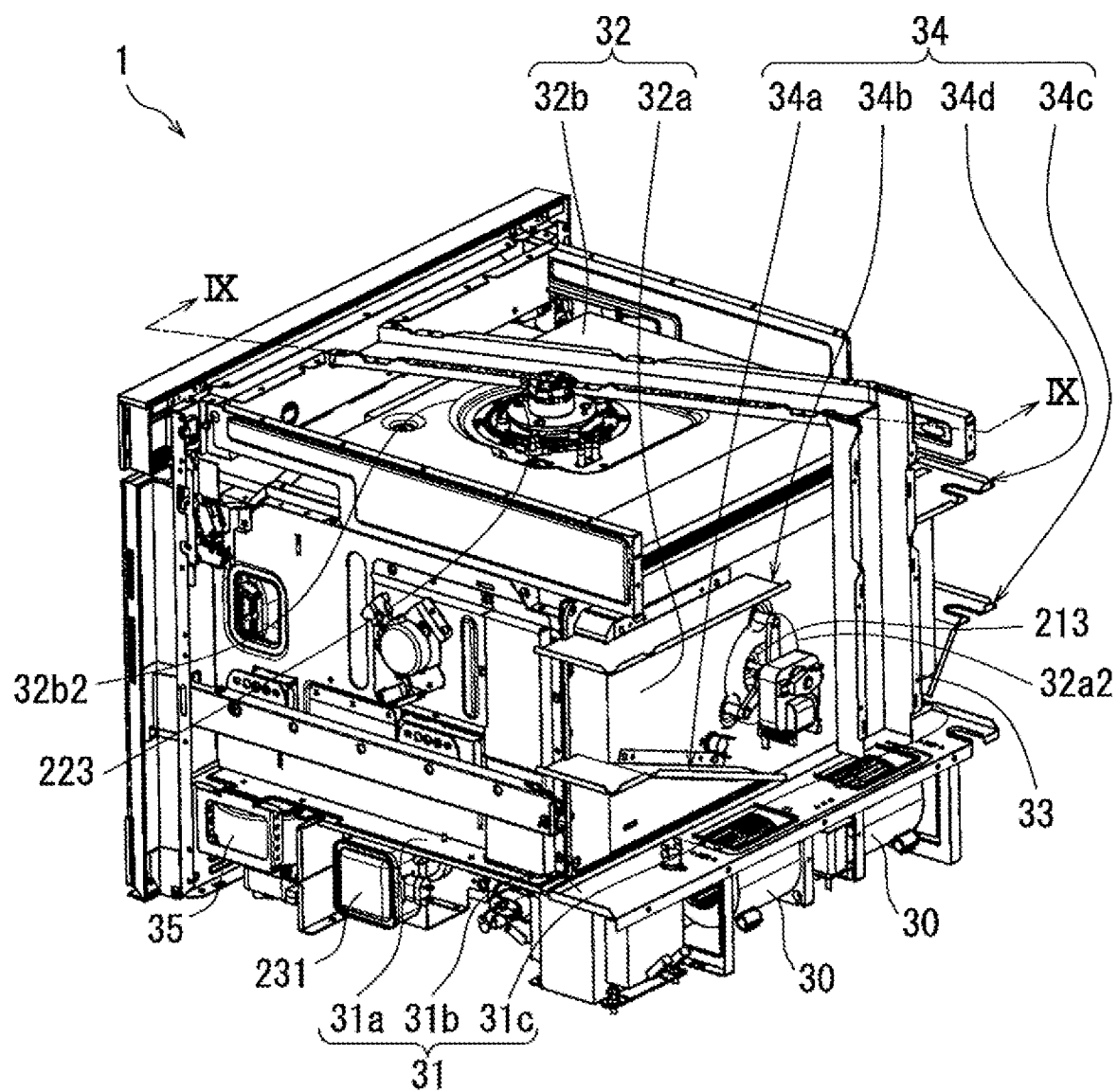
FIG. 8 is a perspective view of the heating cooking apparatus according to the embodiment of the present disclosure.
Figure 10:
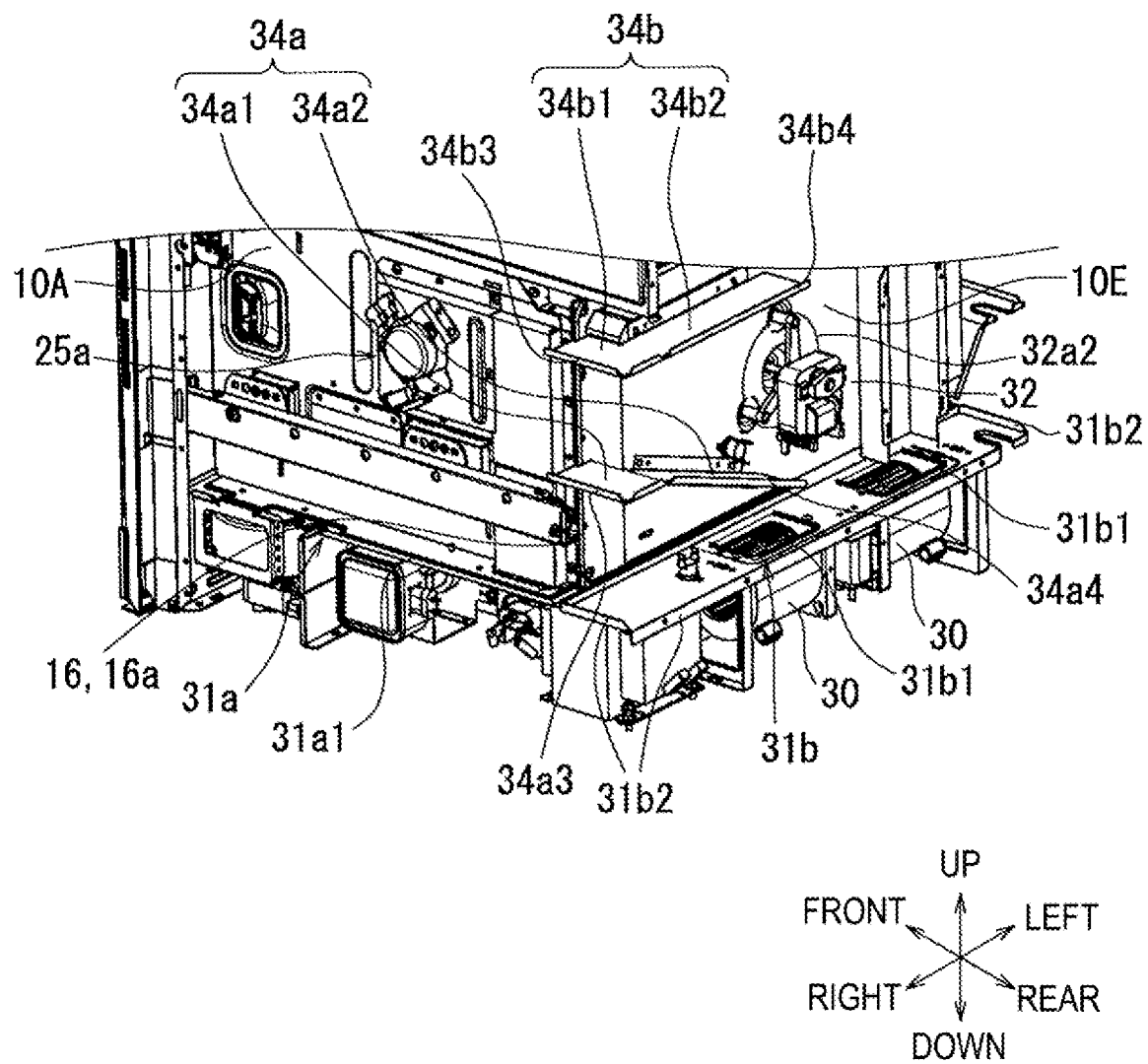
FIG. 10 is a partially enlarged perspective view illustrating the heating cooking apparatus illustrated in FIG. 8.
Figure 11:
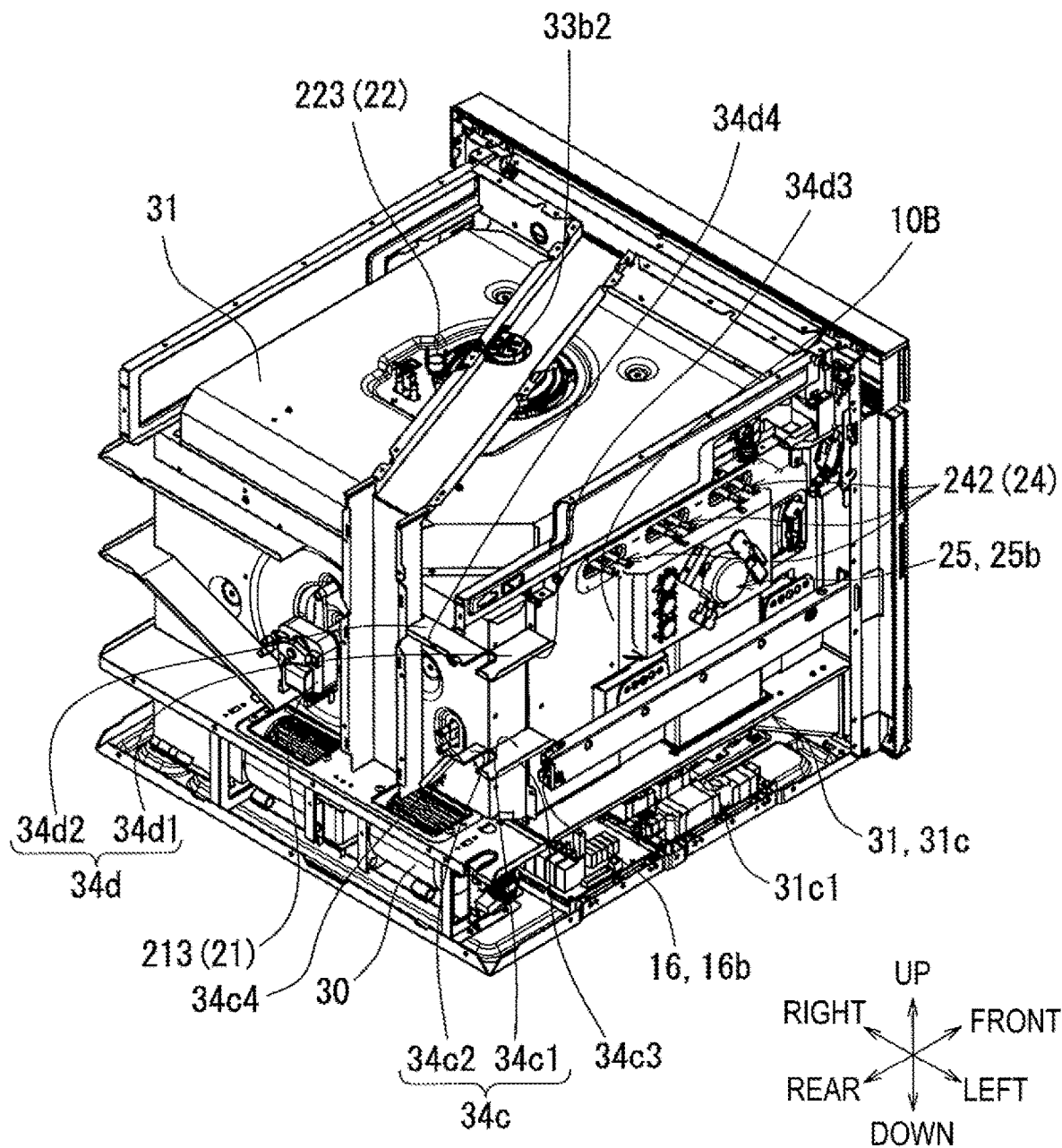
FIG. 11 is a perspective view of the heating cooking apparatus according to the embodiment of the present disclosure.
Figure 12:
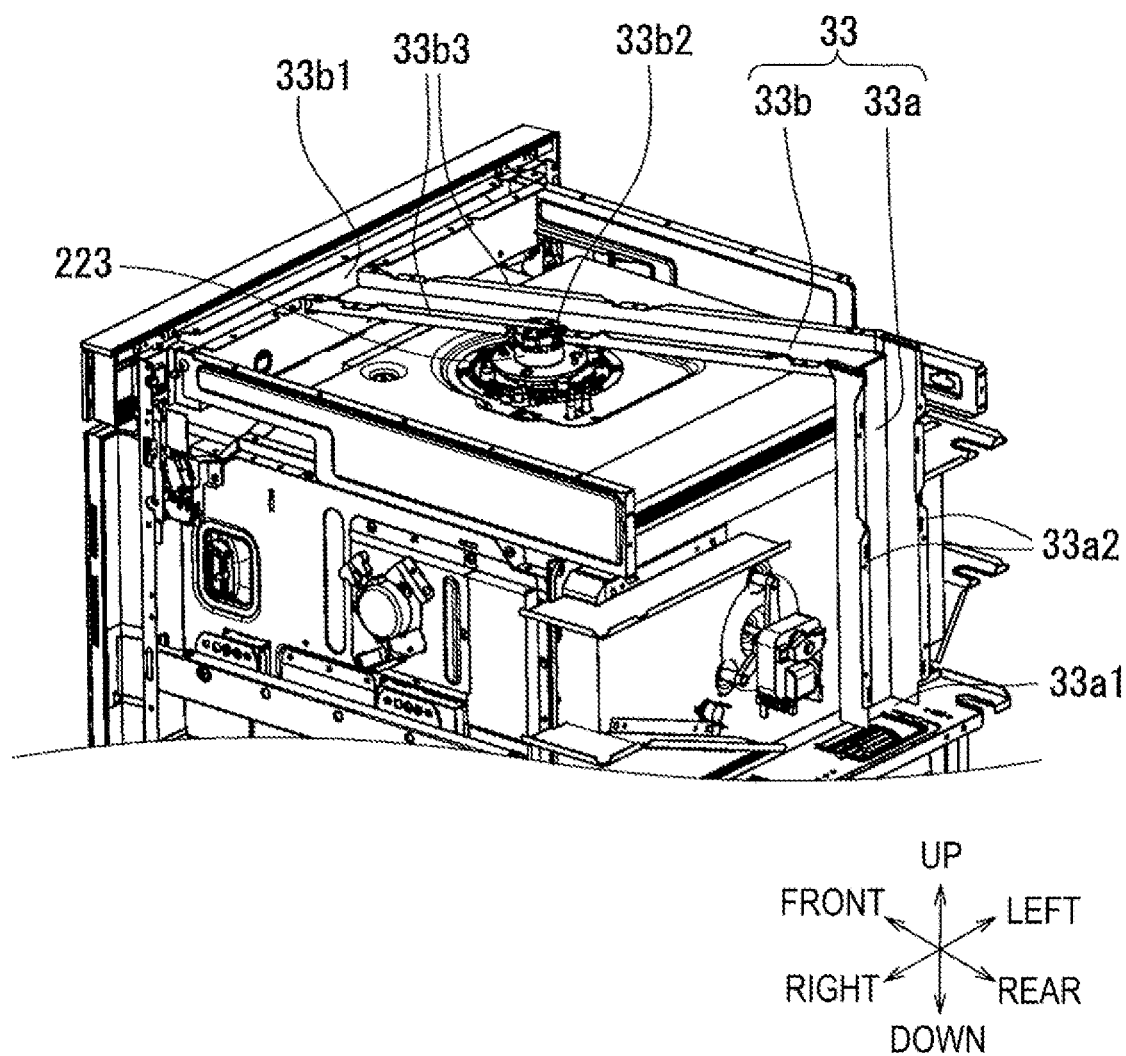
FIG. 12 is a partially enlarged perspective view illustrating the heating cooking apparatus illustrated in FIG.

Next, with reference to FIG. 8 to FIG. 12, the configuration of the heating cooking apparatus 1 will be described in further detail. FIG. 8 is a perspective view of the heating cooking apparatus 1 according to the present embodiment. More specifically, FIG. 8 illustrates the heating cooking apparatus 1 in a state in which the main body outer case 14 is removed, as viewed diagonally from an upper right side from behind. FIG. 9 is a cross-sectional diagram of the heating cooking apparatus 1 taken along the section line IX in FIG. 8. FIG. 10 is a partially enlarged perspective view illustrating the heating cooking apparatus 1 illustrated in FIG. 8. More specifically, FIG. 10 illustrates a part below the center part of the heating cooking apparatus 1. FIG. 11 is a perspective view of the heating cooking apparatus 1 according to the present embodiment. More specifically, FIG. 11 illustrates the heating cooking apparatus 1 in a state in which the main body outer case 14 is removed, as viewed diagonally from an upper left side from behind. FIG. 12 is a partially enlarged perspective view illustrating the heating cooking apparatus 1 illustrated in FIG. 8. More specifically, FIG. 12 illustrates a part above the center part of the heating cooking apparatus 1.

As illustrated in FIG. 8, the heating cooking apparatus 1 further includes a cooling fan 30, a partition plate 31, a first duct member 32, a second duct member 33, a plurality of air deflecting plates 34, and a magnetron fan 35. The cooling fan 30, the partition plate 31, the first duct member 32, the second duct member 33, the plurality of air deflecting plates 34, and the magnetron fan 35 are located in the first space R. The cooling fan 30 is an example of a "fan".

The cooling fan 30 mainly cools components to be cooled that are disposed around the outer surface of the heating chamber 10. The components to be cooled include the pair of right and left slide members 133, the pair of right and left slide rails 16, the first air sending unit 21, the second air sending unit 22, the grill unit 24, the pair of right and left in-chamber light components and the pair of right and left latch switches 18. More specifically, the cooling fan 30 is used to take air outside of the heating cooking apparatus 1 into the first space R and discharge air inside of the first space R to the outside of the heating cooing apparatus 1. As illustrated in FIG. 9, the cooling fan 30 is located on a lower side portion and a rear side portion of the first space R. The cooling fan 30 is located at the same height as the air intake hole parts 11BA of the panel 11. The cooling fan 30 blows out air in an upward direction, so as to generate the blown air flow BF. In the present embodiment, the cooling fan 30 is a cross flow fan.

The partition plate 31 partitions the first space R into an air intake space AR and an exhaust space BR. The partition plate 31 is located at a side portion above the cooling fan 30 in the first space R and a side portion below each of the pair of right and left slide rails 16 and the first duct member 32. The partition plate 31 is attached to the outer surface of the heating chamber 10 from an end portion on the front side of the right wall 10A of the heating chamber 10 to an end portion on the front side of the left wall 10B. In the present embodiment, the air intake space AR is located lower than the partition plate 31 in the first space R. The exhaust space BR is located higher than the partition plate 31 in the first space R.

In the present embodiment, the magnetron 231 of the microwave supply unit 23 is located in the air intake space AR. The pair of right and left slide rails 16, the first air sending unit 21, the second air sending unit 22, and the third energization unit 242 of the grill unit 24 are located in the exhaust space BR. Thus, the temperature of the air in the exhaust space BR is liable to be higher than the temperature of the air in the air intake space AR due to the drive of the heating cooking apparatus 1.

As illustrated in FIG. 8, the partition plate 31 includes a first flat plate part 31a, a second flat plate part 31b, and a third flat plate part 31c. The first flat plate part 31a and the second flat plate part 31b are coupled to each other. The second flat plate part 31b and the third flat plate part 31c are coupled to each other.

As illustrated in FIG. 10, the first flat plate part 31a is an object having a flat plate-like shape with a longitudinal direction corresponding to the front-and-rear direction. The first flat plate part 31a is attached to an outer surface of the right wall. 10A of the heating chamber 10. The first flat plate part 31a is located lower than the right-side slide rail 16a. The first flat plate part 31a includes a bent part 31a1. The bent part 31a1 is formed at an edge portion on the right side of the first flat plate part 31a. The bent part 31a1 is in contact with an inner surface of the right wall 14A (see FIG. 1A and FIG. 1B) of the main body outer case 14.

The second flat plate part 31b is an object having a flat plate-like shape with a longitudinal direction corresponding to the right-and-left direction. The second flat plate part 31b is attached to an outer surface of the rear wall 105 of the heating chamber 10. The second flat plate part 31b is located higher than the cooling fan 30 and lower than the first duct member 32. The second flat plate part 31b includes two blow out hole parts 31b1 and a bent part 31b2. The air blown out by the cooling fan 30 passes through the two blow out hole parts 31b1, so as to be introduced into the exhaust space BR. The bent part 31b2 is formed at an edge portion on the right, an edge portion on the left, and an edge portion on the rear of the second flat plate part 31b. The bent part 31b2 is in contact with inner surfaces of the right wall 14A, the left wall 14B, and the rear wall 145 (see FIGS. 1A and 1B) of the main body outer case 14.

As illustrated in FIG. 11, the third flat plate part 31c is an object having a flat plate-like shape with a longitudinal direction corresponding to the front-and-rear direction. The third flat plate part 31c is attached to an outer surface of the left wall 10B of the heating chamber 10. The third flat plate part 31c is located lower than the left-side slide rail 16b. The third flat plate part 31c includes a bent part 31c1. The bent part 31c1 is formed at an edge portion on the left side of the third flat plate part 31c. The bent part 31c1 is in contact with an inner surface of the left wall 14B (see FIG. 1A and FIG. 1B) of the main body outer case 14.

Figure 9:
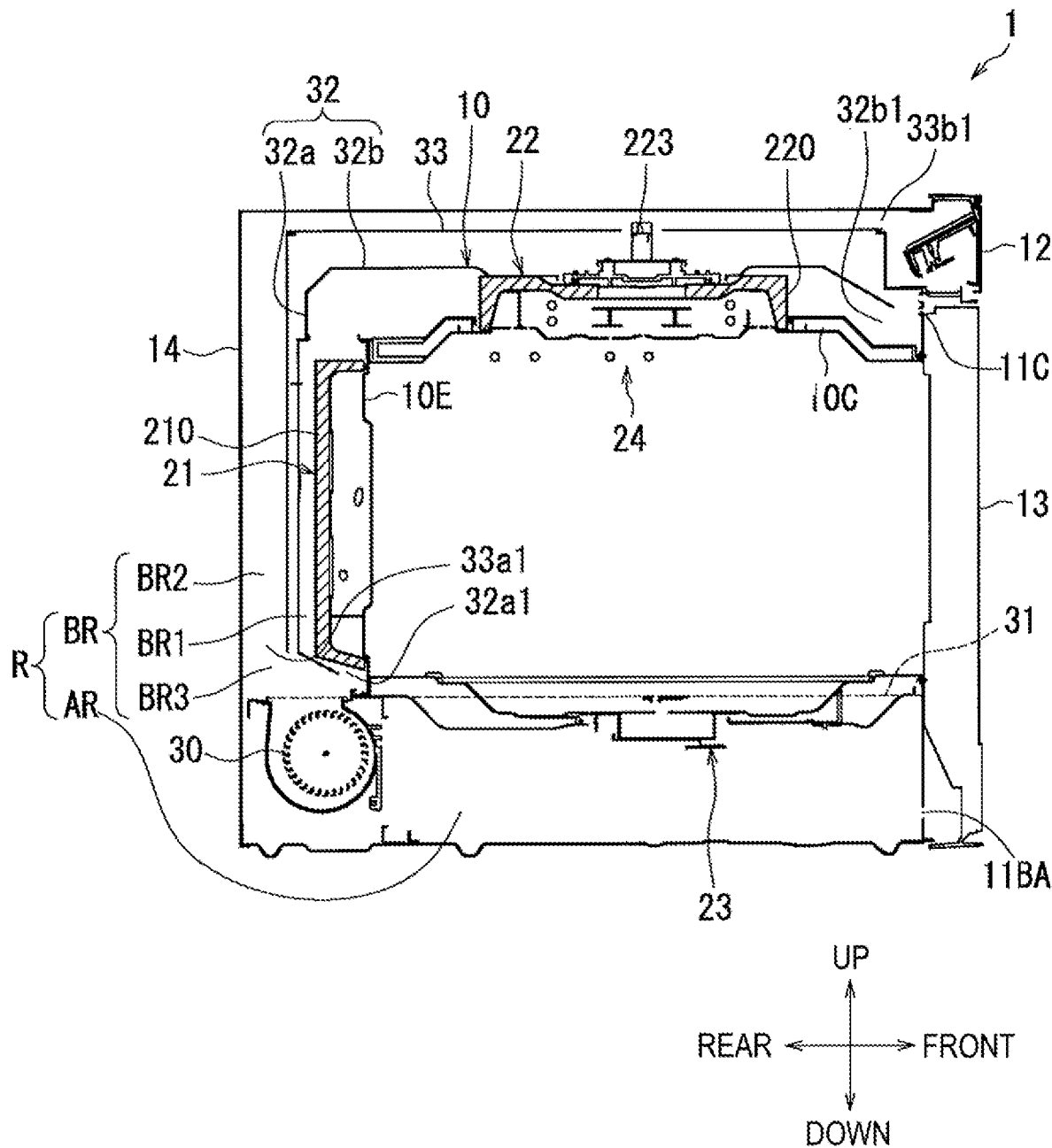
FIG. 9 is a cross-sectional diagram of the heating cooking apparatus taken along the section line IX in FIG. 8.

As illustrated in FIG. 9, the first duct member 32 forms a first exhaust space BR1 in the exhaust space BR. The first exhaust space BR1 is formed between an inner surface of the first duct member 32 and an outer surface of each of the rear wall 10E and the upper wall 100 of the heating chamber 10. The first duct member 32 is attached to the outer surface of the heating chamber 10. The first air sending chamber 210 of the first air sending unit 21 and the second air sending chamber 220 of the second air sending unit 22 are located in the first exhaust space BR1.

The first duct member 32 includes a first cover part 32a and a second cover part 32b. The first cover part 32a and the second cover part 32b are integrally formed with each other.

The first cover part 32a is an object having a plate-like shape. The first cover part 32a is attached to an edge portion of the outer surface of the rear wall 10E of the heating chamber 10 in the right-and-left direction. The first cover part 32a faces a part of the outer surface of the rear wall 10E of the heating chamber 10. The first cover part 32a covers a part of the outer surface of the rear wall 10E of the heating chamber 10 and the first air sending chamber 210 of the first air sending unit 21. An air introduction port 32a1 is formed between the first cover part 32a and the outer surface of the rear wall 10E of the heating chamber 10. The air introduction port. 32a1 is located on an upper side of the cooling fan 30. The air introduction port 32a1 is located close to the cooling fan 30. As illustrated in FIG. 8, the first cover part 32a includes an opening part 32a2. The first drive unit 213 projects through the opening part 32a2.

The second cover part 32b is an object having a plate-like shape. The second cover part 32b is attached to an edge portion of the outer surface of the upper wall 100 of the heating chamber 10 in the right-and-left direction. As illustrated in FIG. 9, the second covers a part 32b faces a part of the outer surface of the upper wall 100 of the heating chamber 10. The second cover part 32b covers a part of the outer surface of the upper wall 100 of the heating chamber 10 and the second air sending chamber 220 of the second air sending unit 22. An air discharge port 32b1 is formed between the second cover part 32b and the upper wall 100 of the heating chamber 10. The air discharge port 32b1 is located further rearward than the exhaust hole parts 11C of the panel 11. The air discharge port 32b1 is located close to the exhaust hole parts 11C of the panel 11. In other words, the air discharge port 32b1 is spaced apart from the exhaust hole parts 11C of the panel 11. As illustrated in FIG. 8, the second cover part 32b includes an opening part 32b2. The second drive unit 22 projects toward the main body outer case 14 through the opening part 32b2.

The first duct member 32 is attached to the outer surface of the heating chamber 10, and thereby functions as a duct. The temperature of the first air sending chamber 210 increases to a high temperature due to the drive of the first air sending unit 21. The temperature of the second air sending chamber 220 increases to a high temperature due to the drive of the second air sending unit 22. The first duct member 32 separates the first air sending chamber 210 and the second air sending chamber 220, whose temperatures increase to high temperatures, away from each other. Thus, the first air sending chamber 210 and the second air sending chamber 220 are disposed at positions where the first air sending chamber 210 and the second air sending chamber 220 are exposed to a first blown air flow BF1 to be described later with reference to FIG. 15 to FIG. 19 and are not exposed to a second blown air flow BF2 to a seventh blown air flow BF7 to be described later with reference to FIG. 15 to FIG. 19. The second blown air flow BF2 to the seventh blown air flow BF7 are an example of a "second air flow".

As illustrated in FIG. 9, the second duct member 33 forms a second exhaust space BR2 in the exhaust space BR. The second exhaust space BR2 is formed between an outer surface of the second duct member 33 and an inner surface of each of the rear wall 14E and the upper wall 14C of the main body outer case 14. The second duct member 33 is disposed in a second space BR3. The second space BR3 refers to a space formed between the inner surface S14 of the main body outer case 14 and an outer surface of the first duct member 32. In other words, the second space BR3 refers to a space in the exhaust space BR excluding the first exhaust space BR1. The second duct member 33 is attached to the operation panel part 12.

As illustrated in FIG. 12, the second duct member 33 includes a first groove part 33a and a second groove part 33b. The first groove part 33a and the second groove part 33b are integrally formed with each other.

The first groove part 33a is a part having a groove shape and having a substantially U-like shape in cross-section with a longitudinal direction corresponding to the up-and-down direction. The first groove part 33a faces the rear wall 14E of the main body outer case 14. The first groove part 33a is not in contact with the first duct member 32. As illustrated in FIG. 9, an air introduction port 33a1 is formed between the first groove part 33a and an inner surface of the rear wall 14E of the main body outer case 14. The air introduction port 33a1 is located on an upper side of the cooling fan 30. The air introduction port 33a1 is located close to the cooling fan 30. As illustrated in FIG. 12, the first groove part 33a includes a bent part 33a2 at an edge portion on a rear side. The bent part 33a2 is in contact with the inner surface of the rear wall 14E (see FIGS. 1A and 1B) of the main body outer case 14.

The second groove part 33b is a part having a groove shape and having a substantially U-like shape in cross-section with a longitudinal direction corresponding to a direction intersecting the front-and-rear direction. The second groove part 33b is attached to the operation panel part 12. The second groove part 33b faces the upper wall 14C of the main body outer case 14. The second groove part 33b is not in contact with the first duct member 32. An air discharge port 33b1 is formed between the second groove part 33b and an inner surface of the upper wall 14C of the main body outer case 14. The air discharge port 33b1 is connected to the operation panel part 12. The second groove part 33b includes an opening part 33b2. The second drive unit 223 projects toward the main body outer case 14 through the opening part 33b2. The second groove part 33b includes a bent part 33b3 at an edge portion on an upper side. The bent part 33b3 is in contact with the inner surface of the upper wall 14C (see FIG. 1A and FIG. 1B) of the main body outer case 14.

In this manner, the second duct member 33 is in contact with the rear wall 14E and the upper wall 14C of the main body outer case 14 of the heating cooking apparatus 1, and thereby functions as a duct. In other words, the second duct member 33 guides the air blown out from the cooling fan 30 directly to the operation panel part 12 without the blown air coming into contact with the outer surface of the heating chamber 10.

As illustrated in FIG. 8, the plurality of air deflecting plates 34 cause the blown air flow BF that is blown out by the cooling fan 30 in an upward direction to branch, guide the blown air flow BF to the components to be cooled, and also distribute air flow necessary for cooling each of the components to be cooled. More specifically, the plurality of air deflecting plates 34 function as a duct that causes a part of the blown air flow BF to branch into five air flows. The plurality of air deflecting plates 34 are attached to an outer surface of the first duct member 32. The plurality of air deflecting plates 34 include a first air deflecting plate 34a, a second air deflecting plate 34b, a third air deflecting plate 34c, and a fourth air deflecting plate 34d.

The first air deflecting plate 34a guides a part of the blown air flow BF blown out by the cooling fan 30 in the upward direction to the right-side slide rail 16a, and also distributes air flow necessary for cooling the right-side slide rail 16a. Accordingly, the first air deflecting plate 34a functions as an air deflecting plate for the right-side slide rail. As illustrated in FIG. 10, the first air deflecting plate 34a includes a first flat plate part 34a1 and a second flat plate part 34a2. The first flat plate part 34a1 and the second flat plate part 34a2 are integrally formed with each other.

The first flat plate part 34a1 is an object having a flat plate-like shape with a longitudinal direction corresponding to the front-and-rear direction. The first flat plate part 34a1 is located higher than the right-side slide rail 16a and lower than the air supply damper 25a. The first flat plate part 34a1 includes a bent part 34a3. The bent part 34a3 is formed at an edge portion on a rear side and a right side of the first flat plate part 34a1. The bent part 34a3 is in contact with an inner surface of the right wall 14A and the rear wall 14E (see FIGS. 1A and 1B) of the main body outer case 14.

The second flat plate part 34a2 is an object having a flat plate-like shape with a longitudinal direction corresponding to a diagonally rightward direction (upper-right-and-lower-left direction). The second flat plate part 34a2 includes a bent part 34a4. The bent part 34a4 is formed at an edge portion on a rear side of the second flat plate part 34a2. The bent part 34a4 is in contact with the inner surface of the rear wall 14E (see FIGS. 1A and 1B) of the main body outer case 14.

The second air deflecting plate 34b guides a part of the blown air flow BF blown out by the cooling fan 30 in the upward direction to the air supply damper 25a. Accordingly, the second air deflecting plate 34b functions as an air deflecting plate for the air supply damper. The second air deflecting plate 34b includes a first flat plate part 34b1 and a second flat plate part 34b2. The first flat plate part 34b1 and the second flat plate part 34b2 are integrally formed with each other.

The first flat plate part 34b1 is an object having a flat plate-like shape with a longitudinal direction corresponding to the front-and-rear direction. The first flat plate part 34b1 is located higher than the air supply damper 25a. The first flat plate part 34b1 includes a bent part 34b3. The bent part 34b3 is formed at an edge portion on a rear side and a right side of the first flat plate part 34b1. The bent part 34b3 is in contact with the inner surface of the right wall 14A and the rear wall 14E (see FIGS. 1A and 1B) of the main body outer case 14.

The second flat plate part 34b2 is an object having a flat plate-like shape with a longitudinal direction corresponding to the right-and-left direction. The second flat plate part 34b2 includes a bent part 34b4. The bent part 34b4 is formed at an edge portion on a rear side of the second flat plate part 34*b*2. The bent part 34*b*4 is in contact with the inner surface of the rear wall 14E (see FIGS. 1A and 1B) of the main body outer case 14.

The third air deflecting plate 34*c* guides a part of the blown air flow BF blown out by the cooling fan 30 in the upward direction to the left-side slide rail 16*b*, and also distributes air flow necessary for cooling the left-side slide rail 16*b*. Accordingly, the third air deflecting plate 34*c* functions as an air deflecting plate for the left-side slide rail. As illustrated in FIG. 11, the third air deflecting elate 34*c* includes a first flat plate part 34*c*1 and a second flat plate part 34*c*2. The first flat plate part 34*c*1 and the second flat plate part 34*c*2 are integrally formed with each other.

The first flat plate part 34*c*1 is an object having a flat plate-like shape with a longitudinal direction corresponding to the front and rear direction. The first flat plate part 34*c*1 is located higher than the left side slide rail 16*b* and lower than the exhaust damper 25*b*. The first flat plate part 34*c*1 includes a bent part 34*c*3. The bent part 34*c*3 is formed at an edge portion on a rear side and a left side of the first flat plate part 34*c*1. The bent part 34*c*3 is in contact with an inner surface of the left wall 14B and the rear wall 14E (see FIGS. 1A and 1B) of the main body outer case 14.

The second flat plate part 34*c*2 is an object having a flat plate-like shape with a longitudinal direction corresponding to a diagonally leftward direction (upper left and-lower-right direction). The second flat plate part 34*c*2 includes a bent part 34*c*4. The bent part 34*c*4 is formed at an edge portion on a rear side of the second flat plate part 34*c*2. The bent part 34*c*4 is in contact with the inner surface of the rear wall 14E (see FIG. 1A and FIG. 1B) of the main body outer case 14.

The fourth air deflecting plate 34*d* guides a part of the blown air flow BF blown out by the cooling fan 30 in the upward direction to the third energization unit 242 of the grill unit 24. Accordingly, the fourth air deflecting plate 34*d* functions as an air deflecting plate for the grill unit. The fourth air deflecting plate 34*d* includes a first flat plate part 34*d*1 and a second flat plate part 34*d*2. The first flat part part 34*d*1 and the second flat plate part 34*d*2 are coupled to each other.

The first flat plate part 34*d*1 is an object having a flat plate-like shape with a longitudinal direction corresponding to the front-and-rear direction. The first flat plate part 34*d*1 is located lower than the third energization unit 242 of the grill unit 24. The first flat plate part 34*d*1 includes a bent part 34*d*3. The bent part 34*d*3 is formed at an edge portion on a rear side and a left side of the first flat plate part 34*d*1. The bent part 34*d*3 is in contact with an inner surface of the left wall 14B and the rear wall 14E (see FIGS. 1A and 1B) of the main body outer case 14.

The second flat plate part 34*d*2 is an object having a flat plate-like shape with a longitudinal direction corresponding to the right-and-left direction. The second flat plate part 34*d*2 includes a bent part 34*d*4. The bent part 34*d*4 is formed at an portion on a rear side of the second flat plate part 34*d*2. The bent part 34*d*4 is in contact with the inner surface of the rear wall 14E (see FIGS. and 1B) of the main body outer case 14.

The magnetron fan 35 cools the magnetron 231 of the microwave supply unit 23. More specifically, the magnetron fan 35 takes in the air outside of the heating cooking apparatus 1 through the plurality of air intake hole parts 11BA described with reference to FIG. 5, and blows the air onto the magnetron 231. The performance characteristics of the magnetron 231 depend on the temperature of the magnetron 231. Thus, the magnetron fan 35 prevents fluctuation of the performance characteristics of the magnetron 231. As illustrated in FIG. 2, the magnetron fan 35 is located lower than the heating chamber 10 and further front than the magnetron 231. The magnetron fan 35 is, for example, a sirocco fan.

Figure 13:
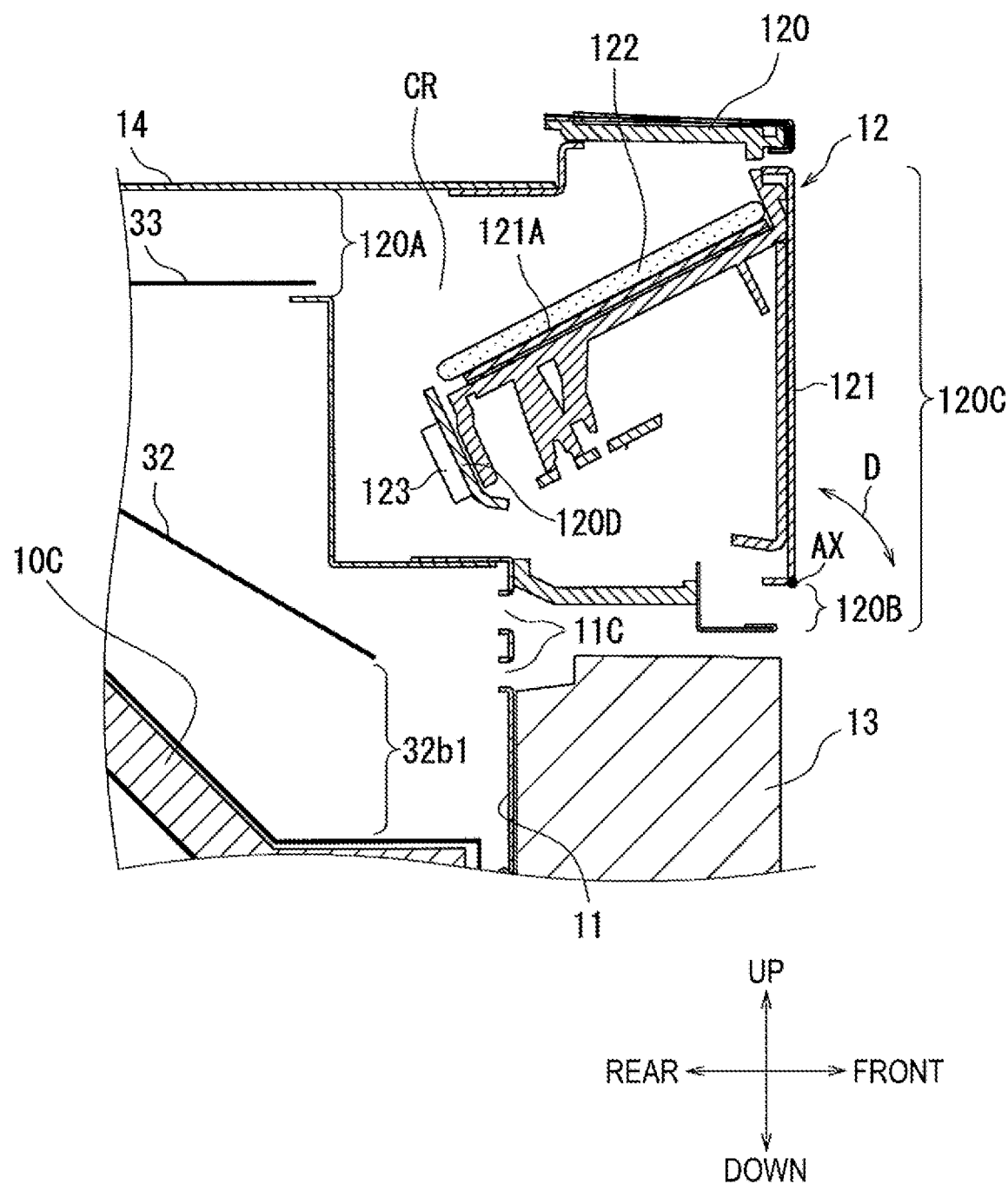
FIG. 13 is a cross-sectional diagram of an operation panel part taken along the section line IX in FIG. 8.

Next, with reference to FIG. 13, the configuration of the operation panel part 12 will be described. FIG. 13 is a cross-sectional diagram of the operation panel part 12 taken along the section line IX in FIG. 8.

As illustrated in FIG. 13, the operation panel part 12 includes an accommodation chamber 120, a movable member 121, an operation unit 122, and a control unit 123. The accommodation chamber 120 accommodates the control unit 123.

The accommodation chamber 220 forms an accommodation space CR inside the accommodation chamber 120. The accommodation chamber 120 includes an air introduction hole part 120A and an air discharge hole part 120B. The air introduction hole part 120A and the air discharge hole part 120B communicate with the accommodation space CR. The air discharge hole part 120B communicates with the out side of the heating cooking apparatus 1.

The accommodation chamber 120 includes an opening part 120C on a front side of the accommodation chamber 120. The opening part 120C communicates with the accommodation space CR. The movable member 121 closes the opening part 120C of the accommodation chamber 120. The movable member 121 includes an attachment part 121A. The attachment part 121A is disposed in the accommodation space CR. More specifically, the movable member 121 is coupled to the accommodation chamber 120 by means of hinge coupling. The movable member 121 has a hinge axis AX. The movable member 121 is pivotable with respect to the accommodation chamber 120 in a circumferential direction D about a center axis of the hinge axis AX.

The operation unit 122 directly receives operation from a user. The movable member 121 includes the attachment part 121A. The operation unit 122 is attached to the attachment part 121A. Thus, when the movable member 121 pivots with respect to the accommodation chamber 120, the operation unit 122 pivots with respect to the accommodation chamber 120 together with the movable member 121. The operation unit 122 includes an operation panel and a display unit. When being operated by a user, the operation panel receives operation information. Specifically, the operation panel includes various keys. The display unit displays various pieces of information. The display unit includes a liquid crystal panel.

Through pivoting with respect to the accommodation chamber 120, the movable member 121 is capable of changing modes between an accommodation mode and a use mode. The accommodation mode refers to a mode in which, as illustrated in FIG. 13, the operation unit 122 is accommodated in the accommodation chamber 120. In other words, the accommodation mode refers to a mode in which the opening part 120C of the accommodation chamber 120 is closed by the movable member 121. The use mode refers to a mode in which the operation unit 122 is pulled out of the accommodation chamber 120 and exposed through the opening part 120C of the accommodation chamber 120.

The control unit 123 controls the electrical components. Specifically, the accommodation chamber 120 includes an attachment part 120D. The attachment part 120D is fixed inside of the accommodation space CR. The control unit 123 is attached to the attachment part 120D. The control unit 123 will be described later with reference to FIG. 14.

The accommodation chamber 120 includes the air introduction hole part 120A and the air discharge hole part 120B.

Each of the air introduction hole part 120A and the air discharge hole part 120B communicates with the accommodation space CR.

Figure 14:
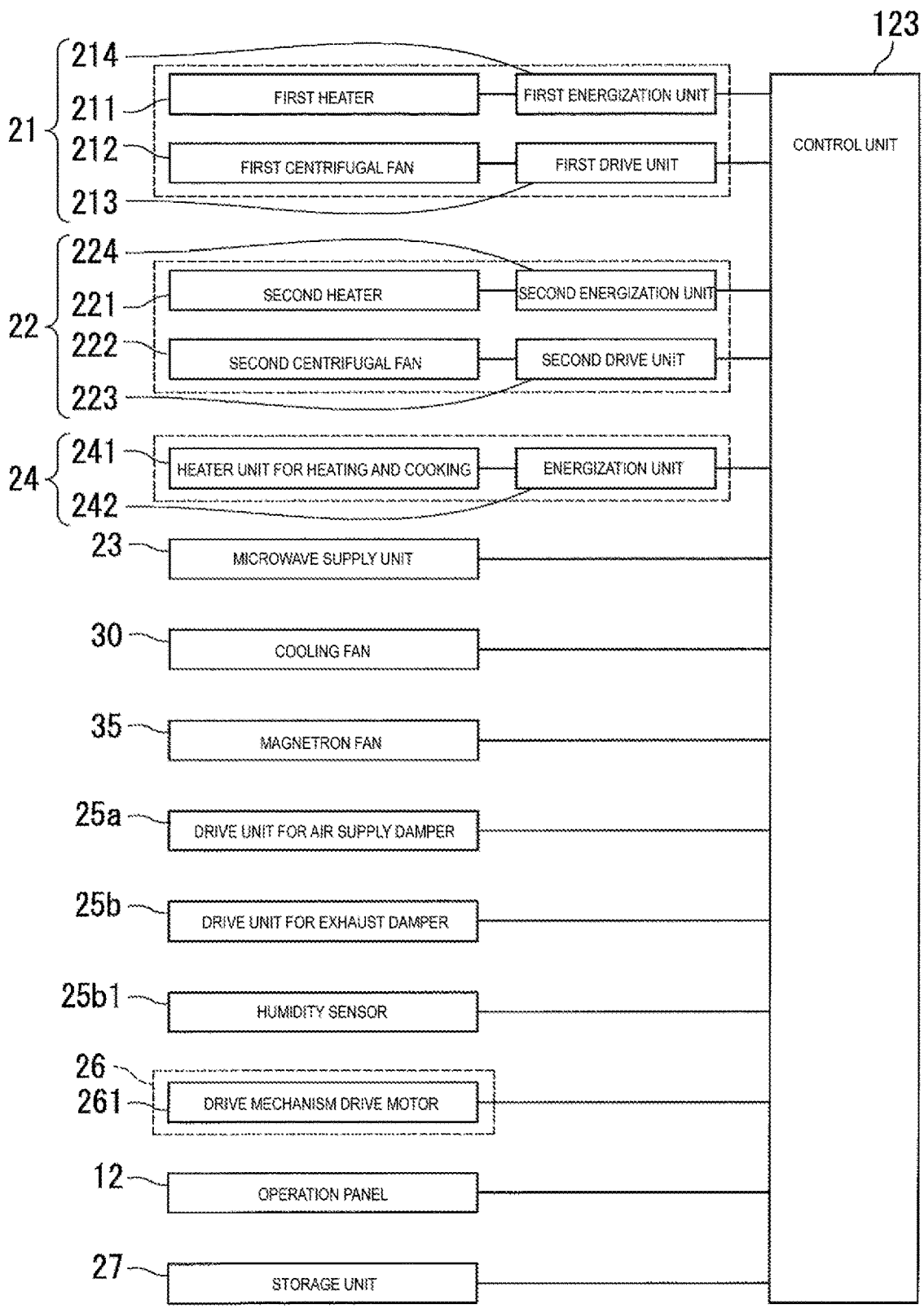
FIG. 14 is a block diagram illustrating a configuration of the heating cooking apparatus according to the embodiment of the present disclosure.

With reference to FIG. 14, the configuration of the heating cooking apparatus 1 will be described in further detail. FIG. 14 is a block diagram illustrating the configuration of the heating cooking apparatus 1 according to the present embodiment.

As illustrated in FIG. 14, the heating cooking apparatus 1 further includes a drive mechanism 26 and a storage unit 27.

The drive mechanism 26 includes a drive mechanism drive motor 261 and a rack pinion mechanism. The rack pinion mechanism includes a pinion. The pinion is attached to a tin end portion of a motor shaft of the drive mechanism drive motor 261. The pinion is engaged with the rack part of the support member 134 described with reference to FIG. 2 and FIG. 3.

The control unit 123 is a hardware circuit. The hardware circuit includes a processor such as a central processing unit (CPU). The control unit 123 executes control programs stored in the storage unit 27 thereby control the first heater 211, the first drive unit 213, the second heater 221, the second drive unit 223, the third energization unit 242, the microwave supply unit 23, the cooling fan 30, the magnetron fan 35, the drive mechanism drive motor 261, the operation panel part 12, and the storage unit 27.

The control unit 123 controls drive of the cooling fan 30 and the magnetron fan 35 according to the type of heating cooking mode received by the operation panel part 12. When being operated by a user, the operation panel part 12 receives a command for setting a heating cooking mode of any of the microwave heating mode, the first hot air circulation heating mode, the second hot air circulation heating mode, and the grill heating mode. The control unit 123 sets the heating cooking mode according to the command received by the operation panel part 12. For example, when the control unit 123 sets the first hot air circulation heating mode, the second hot air circulation heating mode, or the grill heating mode as the heating cooking mode, the control unit 123 drives the cooling fan 30. In this case, the control unit 123 does not drive the magnetron fan 35. When the control unit 123 sets the microwave heating mode as the heating cooking mode, for example, the control unit 123 drives the cooling fan 30 and the magnetron fan 35.

The control unit 123 controls the air supply damper 25a and the exhaust damper 25b according to the type of heating cooking mode received by the operation panel part 12. More specifically, when the control unit 123 sets the first hot air circulation heating mode, the second hot air circulation heating mode, or the grill heating mode as the heating cooking mode, the control unit 123 causes the air supply damper 25a and the exhaust damper 25b to open the air supply hole parts 10A1 and the exhaust hole parts 10B1. In this manner, when the first hot air circulation heating mode, the second hot air circulation heating mode, or the grill heating mode is implemented, the heating cooking chamber 1A is closed. As a result, the temperature inside the heating cooking chamber 1A is maintained. Further, when the control unit 123 sets the microwave heating mode as the heating cooking mode, the control unit 123 causes the air supply damper 25a and the exhaust damper 25b to open the air supply hole parts 10A1 and the exhaust hole parts 10B1. In this manner, when the microwave heating mode is implemented, the heating cooking chamber 1A is opened. As a result, the damper unit 25 can detect a finished state of the object to be heated that has been heated and cooked. More specifically, when the microwave heating mode is implemented, water vapor emitted from the object to be heated in the heating cooking chamber 1A travels from the heating cooking chamber 1A into the exhaust damper 25b. The humidity sensor 25b1 detects an amount of vapor in the exhaust damper 25b. The amount of vapor in the exhaust damper 25b depends on the temperature of the object to be heated that has been heated and cooked. The control unit 123 determines whether the amount of vapor detected by the humidity sensor 25b1 is equal to or more than a predetermined value. The predetermined value indicates an amount of vapor that corresponds to a desired finishing temperature of the object to be heated. When the control unit 123 determines that the amount of vapor detected by the humidity sensor 25b1 is equal to or more than the predetermined value, the control unit 123 ends drive of the microwave supply unit 23. When the control unit 123 determines that the amount of vapor detected by the humidity sensor 25b1 is not equal to or more than the predetermined value, the control unit 123 does not end drive of the microwave supply unit 23. The storage unit 27 stores the predetermined value. The air inside the exhaust damper 25b is discharged to the outside of the heating cooking apparatus 1 through the exhaust hole parts 11BB described with reference to FIG. 5.

The storage unit 27 includes a random access memory (RAM) and a read only memory (ROM). The storage unit 27 stores control programs used for controlling operations of each part of the heating cooking apparatus 1. The storage unit 27 stores setting information input when the operation panel part 12 is operated.

Figure 15:
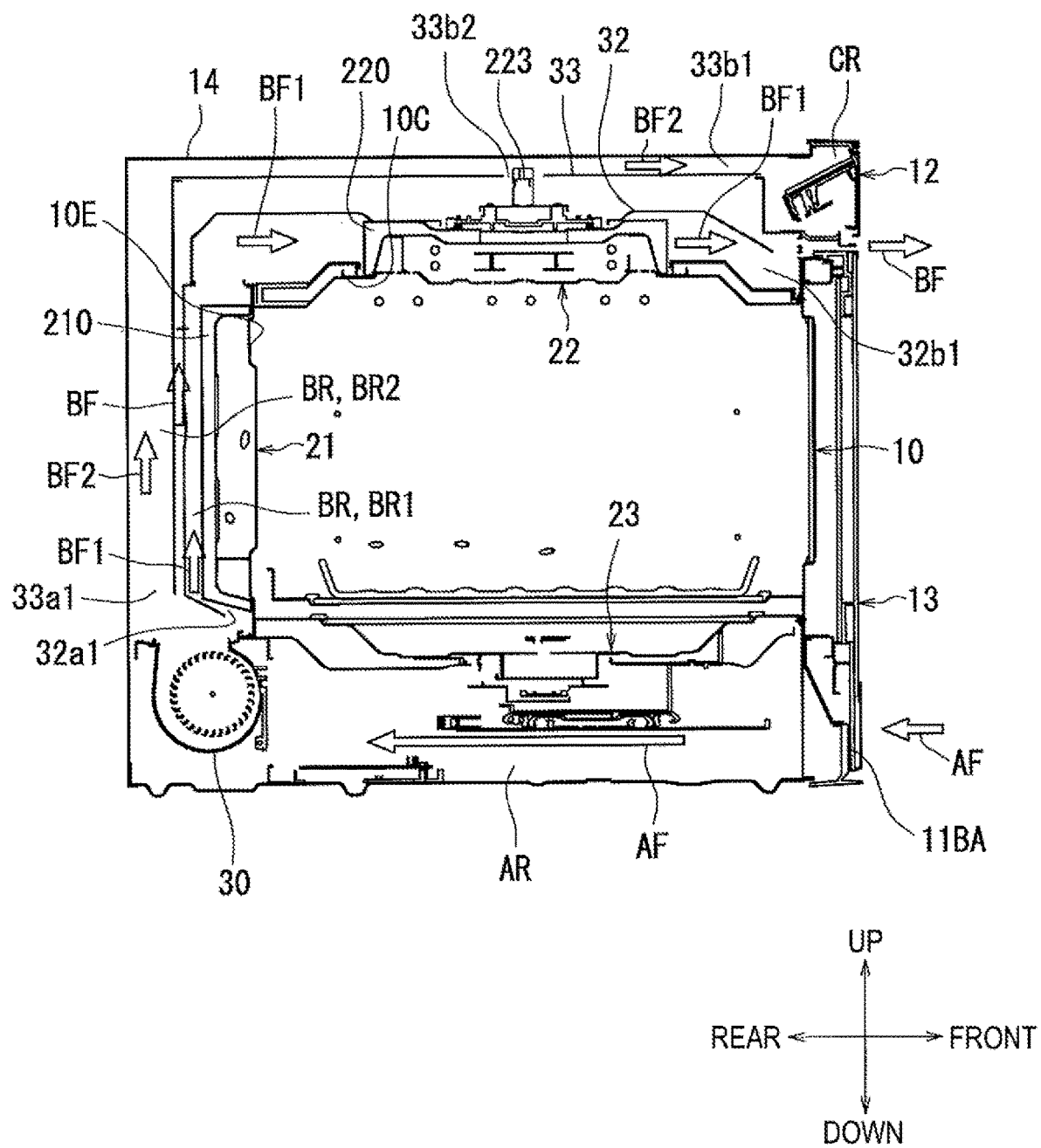
FIG. 15 is a cross-sectional diagram of the heating cooking apparatus taken along the section line IX in FIG. 8.
Figure 16:
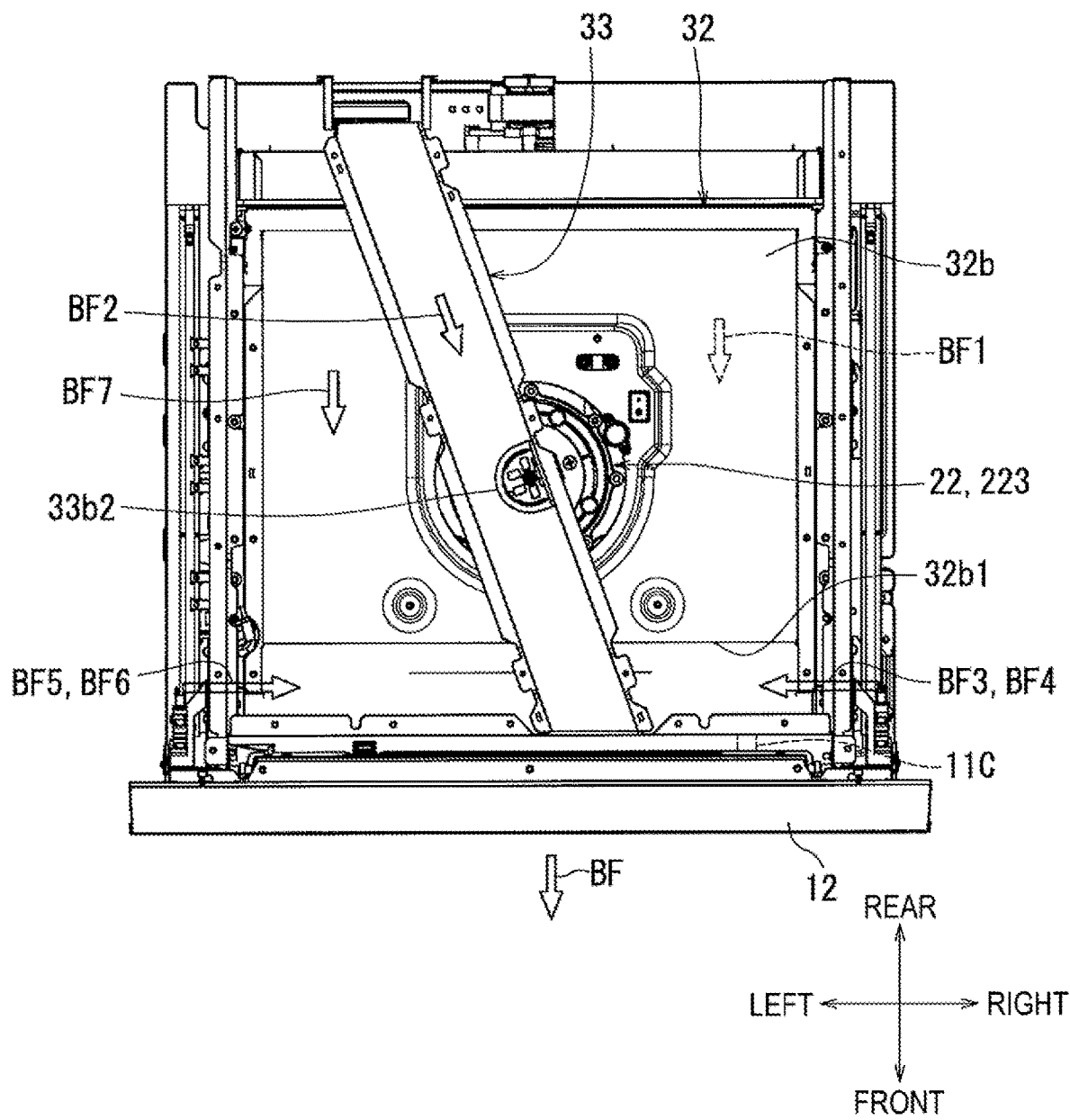
FIG. 16 is a diagram illustrating an upper surface of the heating cooking apparatus according to the embodiment of the present disclosure.
Figure 17:
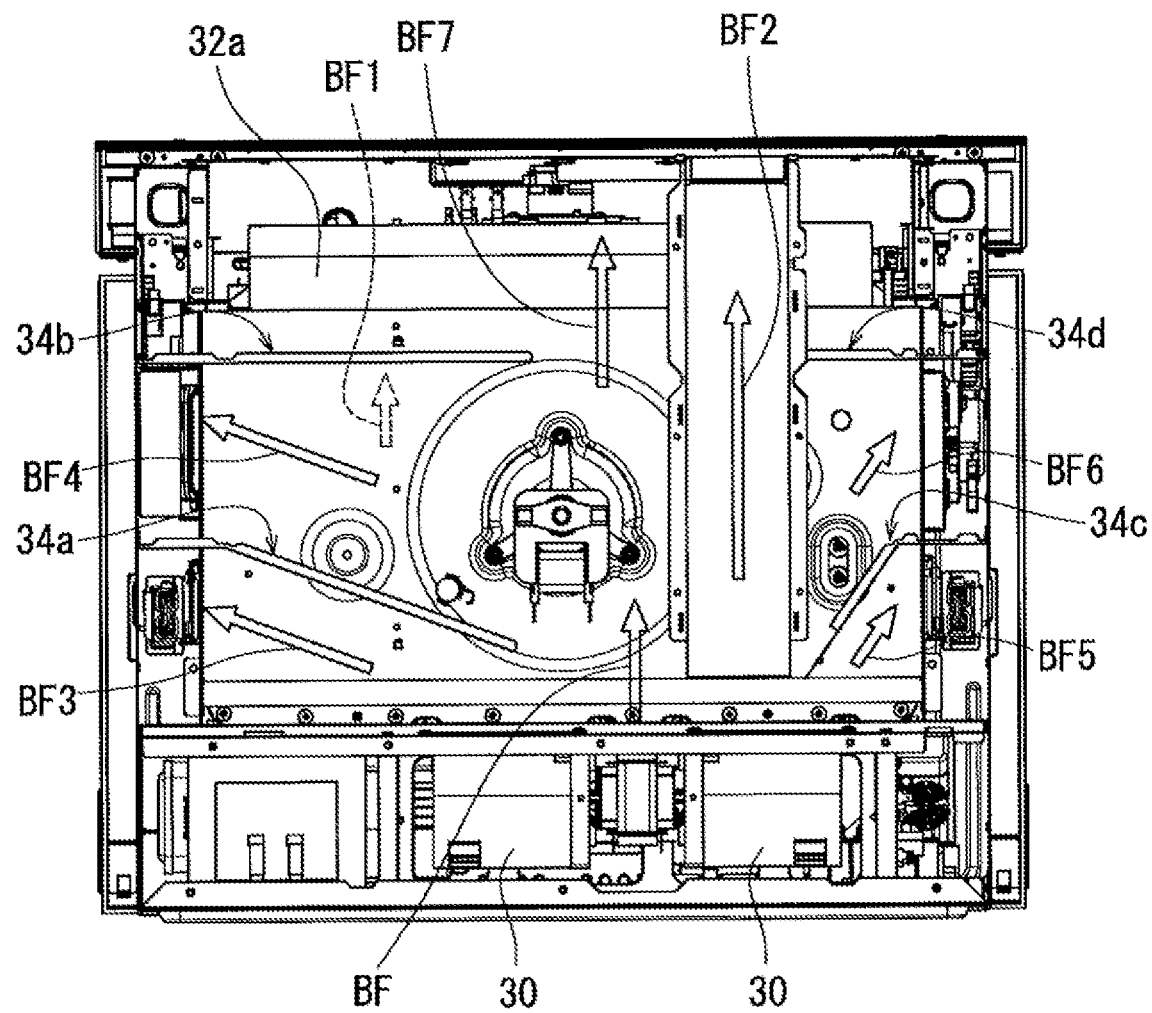
FIG. 17 is a diagram illustrating a back surface of the heating cooking apparatus according to the embodiment of the present disclosure.
Figure 17:
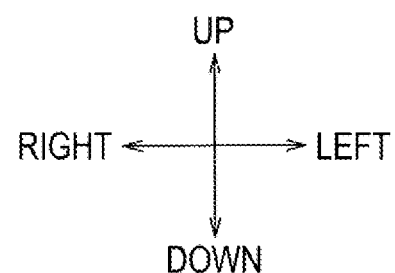
Figure 18:
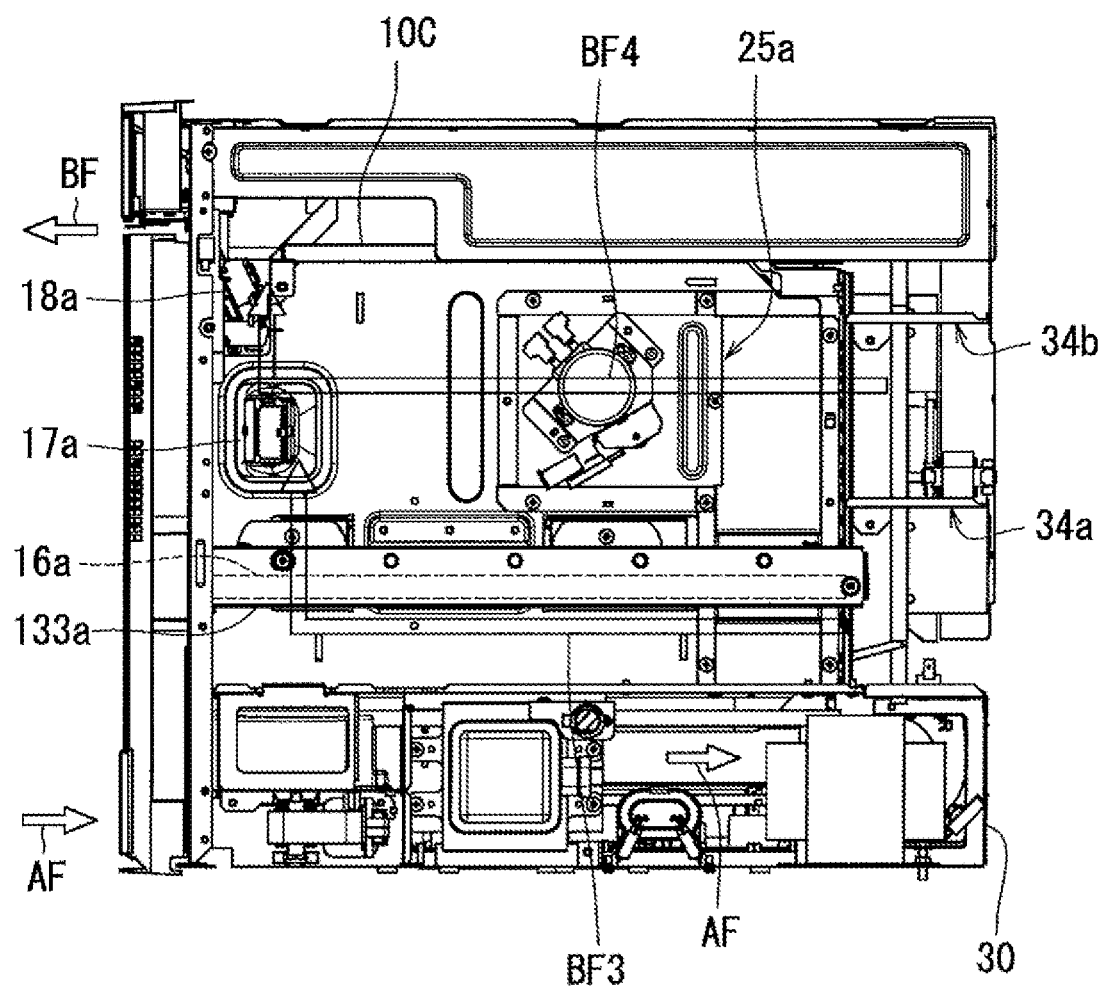
FIG. 18 is a diagram illustrating a right side surface of the heating cooking apparatus according to the embodiment of the present disclosure.
Figure 18:
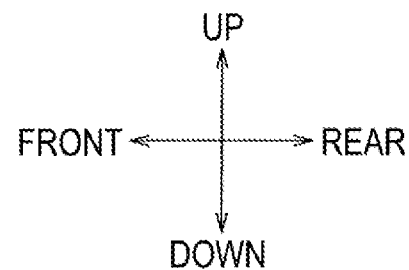
Figure 19:
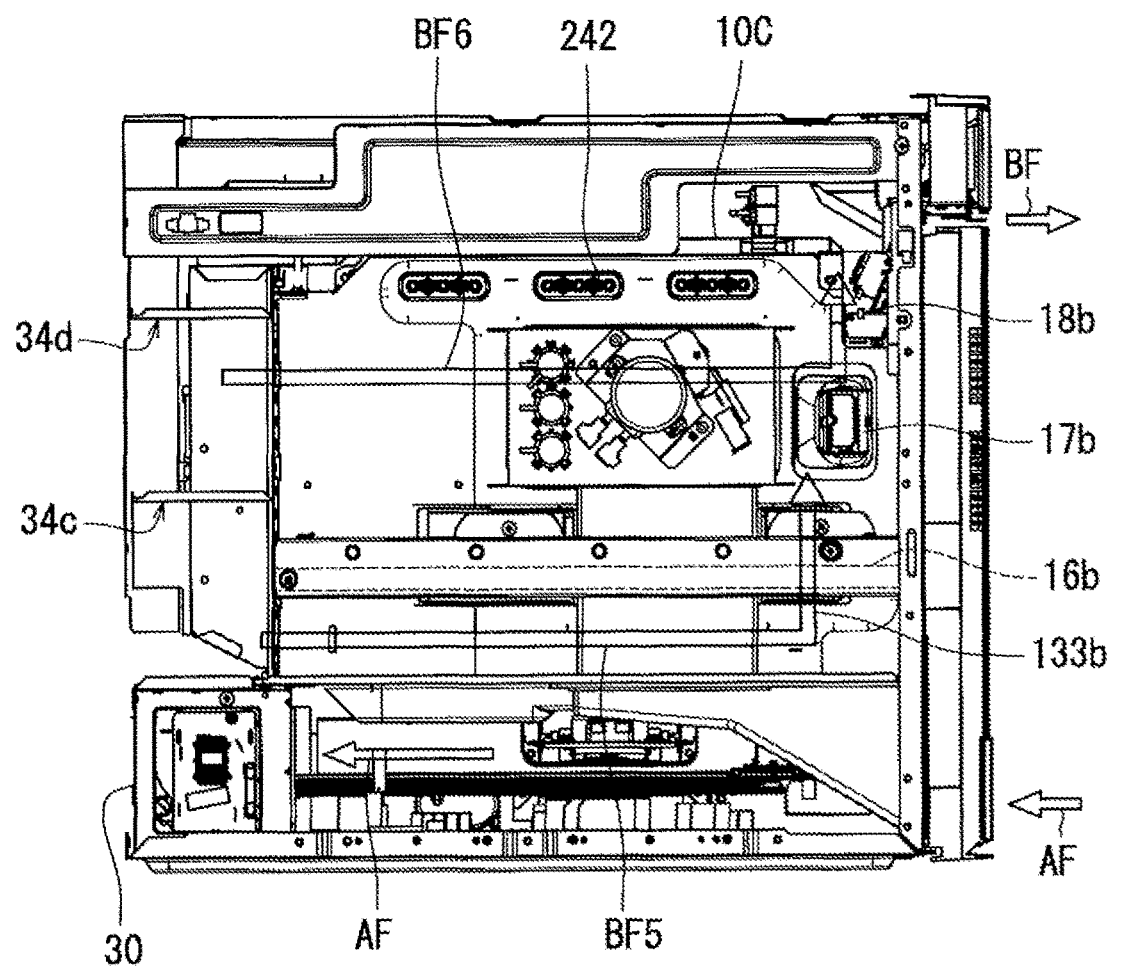
FIG. 19 is a diagram illustrating a left side surface of the heating cooking apparatus according to the embodiment of the present disclosure.

Next, flow of air generated due to the drive of the cooling fan 30 will be described with reference to FIG. 15 to FIG. 19. FIG. 15 is a cross-sectional diagram of the heating cooking apparatus 1 taken along the section line IX in FIG. 8. FIG. 16 is a diagram illustrating an upper surface of the heating cooking apparatus 1 according to the present embodiment. FIG. 17 is a diagram illustrating a back surface of the heating cooking apparatus 1 according to the present embodiment. FIG. 18 is a diagram illustrating a right side surface of the heating cooking apparatus 1 according to the present embodiment. FIG. 19 is a diagram illustrating a left side surface of the heating cooking apparatus 1 according to the present embodiment. Note that, in FIG. 16 to FIG. 19, the main body outer case 14 is omitted.

As illustrated in FIG. 15, when the cooling fan 30 is driven, an intake air flow AF is generated. The intake air flow AF refers to a flow of air that flows from the outside of the heating cooking apparatus 1 toward the cooling fan 30 through the plurality of air intake hole parts 11BA. The intake air flow AF flows through the inside of the air intake space AR described with reference to FIG. 9. At this time, the intake air flow AF cools a power supply and the electrical components that are located in the air intake space AR.

When the cooling fan 30 is driven, the blown air flow BF is generated. The blown air flow BF refers to a flow of air that is blown out from the two blow out hole parts 31b2 of the partition plate 31 described with reference to FIG. 10 in the upward direction and that flows toward the exhaust hole parts 11C of the panel 11 described mainly with reference to FIG. 5. The blown air flow BF flows through the inside of the exhaust space BR.

The blown air flow BF is caused to branch into mainly the first blown air flow BF1 to the seventh blown air flow BF7 by the first duct member 32, the second duct member 33, and the plurality of air deflecting plates 34 described with reference to FIG. 3 and FIG. 10 to FIG. 12. The first blown air flow BF1 refers to a flow of air among the blown air flow BF that flows through the inside of the first duct member 32.

The inside of the first duct member 32 refers to the heating chamber 10 side of the first duct member 32. The second blown air flow BF2 to the seventh blown air flow BF7 refer to flows of air among the blown air flow BF that flow through the outside of the first duct member 32. The outside of the first duct member 32 refers to the main body outer case 14 side of the first duct member 32. The second blown air flow BF2 refers to a flow of air among the blown air flow BF that flows through the outside of the second duct member 33. The outside of the second duct member 33 refers to the main body outer case 14 side of the second duct member 33. The first blown air flow BF1 is an example of a "first air flow". The second blown air flow BF2 to the seventh blown air flow BF7 are an example of a "second air flow". The second blown air flow BF2 is an example of a "third air flow".

The first blown air flow BF1 is formed by the first duct member 32. In other words, the first duct member 32 separates the blown air flow BF into the first blown air flow BF1 and the second blown air flow BF2 to the seventh blown air flow BF7. More specifically, the first blown air flow BF1 is formed through a process in which a part of the blown air flow BF blown out in the upward direction flows from the air introduction port 32a1 into the first exhaust space BR1. The first blown air flow BF1 flows toward the air discharge port 32b1 along an outer surface of the rear wall 10E and the upper wall 100 of the heating chamber 10. At this time, the first blown air flow BF1 cools the first air sending chamber 210 of the first air sending unit 21 and the second air sending chamber 220 of the second air sending unit 22.

Subsequently, the first blown air flow BF1 is discharged through the air discharge port 32b1. As illustrated in FIG. 16, the discharged first blown air flow BF1 flows toward the exhaust hole parts 11C along the upper wall 100 of the heating chamber 10. The air discharge port 32b1 is spaced apart from the exhaust hole parts 11C. Thus, the discharged first blown air flow BF1 joins the third blown air flow BF3 to the seventh blown air flow BF7. Subsequently, the blown air flow BF having a temperature increased through heat exchange due to cooling is discharged to the outside of the heating cooking apparatus 1 through the exhaust hole parts 11C of the panel 11.

The temperature of each of the first air sending chamber 210 and the second air sending chamber 220 is liable to be a temperature higher than the temperature of each of the pair of right and left slide rails 16 and the third energization unit 242 of the grill unit 24. Thus, the temperature of the air that forms the first blown air flow BF1 to be discharged through the air discharge port 32b1 is liable to be a higher temperature than that of the air that forms the third blown air flow BF3 to the seventh blown air flow BF7 through heat exchange due to cooling. When the first blown air flow BF1 joins the third blown air flow BF3 to the seventh blown air flow BF7, the temperature of the air that forms the blown air flow BF to be discharged through the exhaust hole parts 11C is reduced lower than the temperature of the air that forms the first blown air flow BF1 to be discharged through the air discharge port 32b1.

As illustrated in FIG. 15, the second blown air flow BF2 is formed by the second duct member 33. More specifically the second blown air flow BF2 is formed through a process in which a part of the blown air flow BF blown out in the upper direction flows from the air introduction port 33a1 into the second exhaust space BR2. The second blown air flow BF2 flows toward the operation panel part 12 along the inner surface of the rear wall 14E and the upper wall 14C of the main body outer case 14. At this time, the second blown air flow BF2 cools the second drive unit 223 of the second air sending unit 22 projecting through the opening part 33b2 described with reference to FIG. 12.

Subsequently, the second blown air flow BF2 is discharged through the air discharge port 33b1. The discharged second blown air flow BF2 is introduced into the accommodation space CR through the air introduction hole part 120A described with reference to FIG. 13. Subsequently, the second blown air flow BF2 in the accommodation space CR is discharged to the outside of the heating cooing apparatus 1 through the air discharge hole part 120B. At this time, the second blown air flow BF2 cools the control unit 123.

As illustrated in FIG. 17, the third blown air flow BF3 is formed by the first air deflecting plate 34a. More specifically, the third blown air flow BF3 is formed through a process in which a part of the blown air flow BF blown out in the upward direction contacts the first air deflecting plate 34a and flows toward the right-side slide rail 16a. As illustrated in FIG. 18, after flowing along the right-side slide rail 16a, the third blown air flow BF3 flows in the upward direction. In this case, the third blown air flow BF3 cools the right-side slide member 133a, the right-side slide rail 16a, the right-side in-chamber light component 17a, and the right-side latch switch 18a, for example. Subsequently, as illustrated in FIG. 16, the third blown air flow BF3 flows toward the exhaust hole parts 11C along the upper wall 100 of the heating chamber 10. At this time, the third blown air flow BF3 joins the first blown air flow BF1 and the fourth blown air flow BF4 to the seventh blown air flow BF7. Subsequently, the blown air flow BF having a temperature increased through heat exchange due to cooling is discharged to the outside of the heating cooking apparatus 1 through the exhaust parts 11C of the panel 11.

As illustrated in FIG. 17, the fourth blown air flow BF4 is formed by the second air deflecting plate 34b. More specifically, the fourth blown air flow BF4 is formed through a process in which a part of the blown air flow BF blown out in the upward direction contacts the second air deflecting plate 34b and flows toward the air supply damper 25a. Subsequently, as illustrated in FIG. 18, after flowing along the right wall 10A of the heating chamber 10, the fourth blown air flow BF4 flows in the upward direction. At this time, a part of the fourth blown air flow BF4 is supplied to the heating cooking chamber 1A when the air supply damper 25a opens the air supply hole part 10A1 of the heating chamber 10. Further, the fourth blown air flow BF4 cools the right-side in-chamber light component 17a and the right-side latch switch 18a, for example. Subsequently, as illustrated in FIG. 16, the fourth own air flow BF4 flows toward the exhaust hole parts 11C along the upper wall 100 of the heating chamber 10. At this time, the fourth blown air flow BF4 joins the first blown air flow BF1 and the third blown air flow BF3 to the seventh blown air flow BF7. Subsequently, the blown air flow BF having a temperature increased through heat exchange due to cooling is discharged to the outside of the heating cooking apparatus 1 through the exhaust hole parts 11C of the panel 11.

As illustrated in FIG. 17, the fifth blown air flow BF5 is formed by the third air deflecting plate 34c. More specifically, the fifth blown air flow BF5 is formed through a process in which a part of the blown air flow BF blown out in the upward direction contacts the third air deflecting plate 34c and flows toward the left-side slide rail 16b. As illustrated in FIG. 19, after flowing along the left-side slide rail 16b, the fifth blown air flow BF5 flows in the upper direction. At this time, the fifth blown air flow BF5 cools the left-side slide member 133b, the left-side slide rail 16b, the left-side in-chamber light component. 17b, and the left-side latch switch 18b, for example. Subsequently, as illustrated in FIG. 16, the fifth blown air flow BF5 flows toward the exhaust hole parts 11C along the upper wall 10C of the heating chamber 10. At this time, the fifth blown air flow BF5 loins the first blown air flow BF1, the third blown air flow BF3, the fourth blown air flow BF4, the sixth blown air flow BF6, and the seventh blown air flow BF7. Subsequently, the blown air flow BF having a temperature increased through heat exchange due to cooling is discharged to the outside of the heating cooking apparatus 1 through the exhaust hole parts 11C of the panel 11.

As illustrated in FIG. 17, the sixth blown air flow BF6 is formed by the fourth air deflecting plate 34d. More specifically, the sixth blown air flow BF6 is formed through a process in which a part of the blown air flow BF blown out in the upward direction contacts the fourth air deflecting plate 34d and flows toward the third energization unit 242 of the grill unit 24. Subsequently, as illustrated in FIG. 19, after flowing along the left wall 10B of the heating chamber 10, the sixth blown air flow BF6 flows in the upward direction. At this time, the sixth blown air flow BF6 cools the third energization unit 242 of the grill unit 24, the left-side in-chamber light component 17b, and the left-side latch switch 18b, for example. Subsequently, as illustrated in FIG. 16, the sixth blown air flow BF6 flows toward the exhaust hole parts 11C along the upper wall 10O of the heating chamber 10. At this time, the sixth blown air flow BF6 joins the first blown air flow BF1, the third blown air flow BF3 to the fifth blown air flow BF5, and the seventh blown air flow BF7. Subsequently, the blown air flow BF having a temperature increased through heat exchange due to cooling is discharged to the outside of the heating cooking apparatus 1 through the exhaust hole parts 11C of the panel 11.

As illustrated in FIG. 17, the seventh blown air flow BF7 is formed by not coming into contact with the plurality of air deflecting plates 34. The seventh blown air flow BF7 flows in the upward direction along an outer surface of the first cover part 32a of the first duct member 32. Subsequently, as illustrated in FIG. 16, after flowing along an outer surface of the second cover part 32b of the first duct member 32, the seventh blown air flow BF7 flows toward the exhaust hole parts 110 along the upper wall 10O of the heating chamber 10. At this time, the seventh blown air flow BF7 joins the first blown air flow BF1 and the third blown air flow BF3 to the sixth blown air flow BF6. Subsequently, the blown air flow BF having a temperature increased through heat exchange due to cooling is discharged to the outside of the heating cooking apparatus 1 through the exhaust hole parts 11C of the panel 11.

Figure 20:
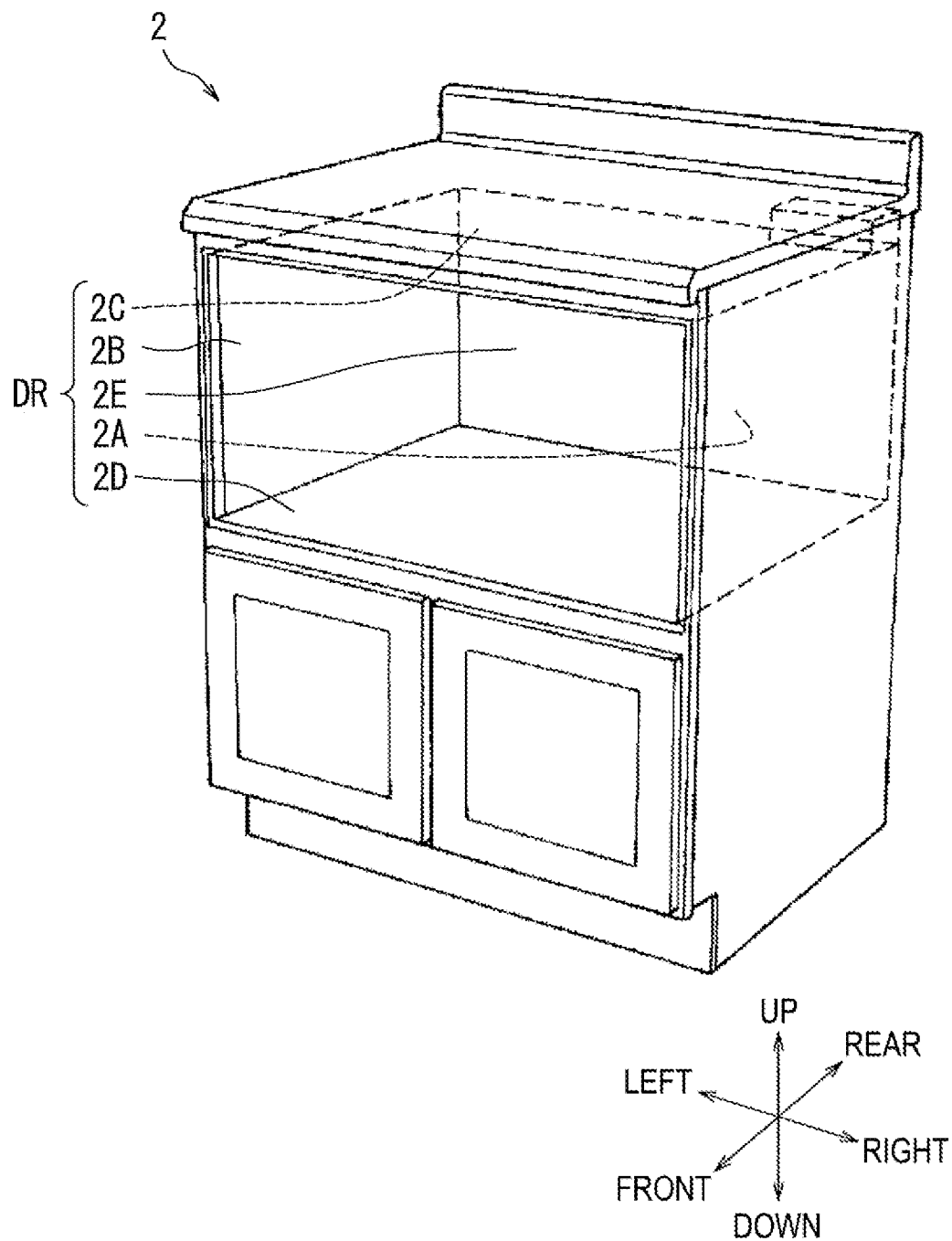
FIG. 20 is a perspective view of a cabinet built with the heating cooking apparatus according to the embodiment of the present disclosure.

Next, a cabinet 2 in which the heating cooking apparatus 1 is built will be described with reference to FIG. 20. FIG. 20 is a diagram illustrating an external appearance of the cabinet 2 in which the heating cooking apparatus 1 is built according to the present embodiment.

The heating cooking apparatus 1 is disposed in the form of being built into the cabinet 2. As illustrated in FIG. 20, the cabinet 2 includes an accommodation space DR. The heating cooking apparatus 1 is disposed in the accommodation space DR. The accommodation space DR is a space having a rectangular parallelepiped shape. The cabinet 2 includes a right inner surface 2A, a left inner surface 2B, an upper inner surface 2C, a lower inner surface 2D, and a rear inner surface 2E. The accommodation space DR is formed by the right inner surface 2A, the left inner surface 2B, the upper inner surface 2C, the lower inner surface 2D, and the rear inner surface 2E.

As has been described with reference to FIG. 1A to FIG. 20, the heating cooking apparatus 1 includes the heating chamber 10, the main body outer case 14, the cooling fan 30, the first duct member 32, the first air sending unit 21, and the second air sending unit 22. The first duct member 32 separates the blown air flow BF into the first blown air flow BF1 and the second blown air flow BF2 to the seventh blown air flow BF7. The first air sending unit 21 includes the first air sending chamber 210 and the first heater 211. The second air sending unit 22 includes the second air sending chamber 220 and the second heater 221. The first air sending chamber 210 and the second air sending chamber 220 are disposed at positions where the first air sending chamber 210 and the second air sending chamber 220 are exposed to the first blown air flow BF1 and are not exposed to the second blown air flow BF2 to the seventh blown air flow BF7. The temperature of the first air sending chamber 210 increases to a high temperature due to the drive of the first air sending unit 21. The temperature of the second air sending chamber 220 increases to a high temperature due to the drive of the second air sending unit 22. The first air sending chamber 210 and the second air sending chamber 220 are covered by the first duct member 32. Owing to this configuration, heat of the first air sending chamber 210 and heat of the second air sending chamber 220 are less liable to be transferred to the air forming the second blown air flow BF2 to the seventh blown air flow BF7. In other words, the heating cooking apparatus 1 can minimize increase of the temperature of the air forming the second blown air flow BF2 to the seventh blown air flow BF7 even when the first air sending unit 21 or the second air sending unit 22 is driven. As a result, the heating cooking apparatus 1 can more efficiently cool the components to be cooled as compared to when the first duct member 32 is not attached.

As has been described with reference to FIG. 1A to FIG. 20, the heating cooking apparatus 1 includes the panel 11. The panel 11 includes the exhaust hole parts 11C. The first duct member 32 includes the air discharge port 32b1. The air discharge port 32b1 is spaced apart from the exhaust hole parts 110. The temperature of the air forming the first blown air flow BF1 increases to a higher temperature than the temperature of the air forming the second blown air flow BF2 to the seventh blown air flow BF7 when the first air sending unit 21 or the second air sending unit 22 is driven. The first blown air flow BF1 and the third blown air flow BF3 to the seventh blown air flow BF7 are mixed together before reaching the exhaust hole parts 11C, and are discharged to the outside of the heating cooking apparatus 1 through the exhaust hole parts 11C. Owing to this configuration, the heating cooking apparatus 1 can reduce the temperature of the air forming the blown air flow BF to be blown out of the exhaust hole parts 11C to be lower compared to when the first blown air flow BF1 is directly discharged to the outside of the heating cooking apparatus 1.

As has been described with reference to FIG. 1A to FIG. 20, the heating cooking apparatus 1 includes the operation panel part 12 and the second duct member 33. The operation panel part 12 includes the control unit 123 and the accommodation chamber 120. The accommodation chamber 120 accommodates the control unit 123. The second duct member 33 forms the second blown air flow BF2. The accommodation chamber 120 includes the air introduction hole part 120A and the air discharge hole part 120E. The operation of the control unit 123 is likely to be affected by temperature. The heating cooking apparatus 1 directly guides a part of the blown air flow BF into the accommodation chamber 120 through the second duct member 33.

Owing to this configuration, the heating cooking apparatus 1 can more easily introduce low-temperature air into the accommodation chamber 120 as compared to when the second duct member 33 is not provided. In other words, the heating cooking apparatus 1 can efficiently cool the control unit 123. As a result, the heating cooking apparatus 1 is driven more stably.

As has been described with reference to FIG. 1A to FIG. 20, the heating cooking apparatus 1 includes the drawer body 13, the pair of right and left slide rails 16, the first air deflecting plate 34a, and the third air deflecting plate 34c. The first air deflecting plate 34a functions as the air deflecting plate for the right side slide rail. The third air deflecting plate 34c functions as the air deflecting plate for the left-side slide rail. The drawer body 13 includes the pair of right and left slide members 133. The temperatures of the pair of right and left slide rails 16 and the pair of right and left slide members 133 increase to high temperatures due to heat transfer from the outer surface of the heating chamber 10. The heating cooking apparatus 1 can cool the pair of right and left slide rails 16 and the pair of right and left slide members 133 owing to the third blown air flow BF3 and the fifth blown air flow BF5. As a result, the heating cooking apparatus 1 can enhance durability of the pair of right and left slide rails 16 and the pair of right and left slide members 133.

As has been described with reference to FIG. 1A to FIG. 20, the heating cooking apparatus 1 includes the grill unit 24 and the fourth air deflecting plate 34d. The fourth air deflecting plate 34d functions as the air deflecting plate for the grill unit. The grill unit 24 includes the heater unit for heating and cooking 241 and the third energization unit 242. The fourth air deflecting plate 34d guides the sixth blown air flow BF6 to the third energization unit 242. The heating cooking apparatus 1 is capable of heating and cooking by using radiant heat. The heating cooking apparatus 1 can cool the third energization unit 242 of the grill unit 24 due to the sixth blown air flow BF6.

As has been described with reference to FIG. 1A to FIG. 20, the heating cooking apparatus 1 includes the first air sending unit 21 and the second air sending unit 22. Owing to this configuration, the heating cooking apparatus 1 is capable of heating and cooking requiring different heat conditions.

As has been described with reference to FIG. 1A to FIG. 20, the heating cooking apparatus 1 includes the microwave supply unit 23. The heating cooking apparatus 1 is capable of heating and cooking by using microwaves.

As has been described with reference to FIG. 1A to FIG. 20, the heating cooking apparatus 1 includes the partition plate 31. The temperature of the air in the exhaust space BR is higher than the temperature of the air in the air intake space AR due to the temperature of the outer surface of the heating chamber 10, for example. The partition plate 31 can more securely prevent the air in the air intake space AR and the air in the exhaust space BR from being mixed together. Owing to this configuration, the heating cooking apparatus 1 can more easily blow out low-temperature air into the exhaust space BR. As a result, the heating cooking apparatus 1 can efficiently cool the components to be cooled.

As has been described with reference to FIG. 1A to FIG. 20, the panel 11 includes the opening part 11A. As illustrated in FIG. 5, the air intake hole parts 11BA and the exhaust hole parts 11C are disposed to interpose the opening part 11A. Owing to this configuration, the high-temperature air discharged through the exhaust hole parts 11C is less liable to be taken in through the air intake hole parts 11BA. As a result, the heating cooking apparatus 1 can efficiently cool the components to be cooled.

As has been described with reference to FIG. 1A to FIG. 20, the air intake hole parts 11BA are disposed on a lower side of the opening part 11A. The exhaust hole parts 11C are disposed on an upper side of the opening part 11A. The high-temperature air more easily rises than the low-temperature air. Thus, the high-temperature air discharged through the exhaust hole parts 110 is less liable to be taken in through the air intake hole parts 11BA. As a result, the heating cooking apparatus 1 can more efficiently cool the components to be cooled. Further, the heating cooking apparatus 1 can efficiently prevent the temperature of the components to be cooled from increasing even when there is no space for disposing the air intake hole parts 11BA and the exhaust hole parts 11C on the right side and the left side of the opening part 11A.

As has been described with reference to FIG. 1A to FIG. 20, the cooling fan 30 is located at the same height as the air intake hole parts 11BA. Owing to this configuration, the cooling fan 30 can more easily take in air through the air intake hole parts 11BA as compared to when the cooling fan 30 is not disposed at the same height as the air intake hole parts 11BA. As a result, the heating cooking apparatus 1 can more efficiently cool the components to be cooled.

As has been described with reference to FIG. 1A to FIG. 20, the cooling fan 30 is located on a rear side of the heating chamber 10. Owing to this configuration, the cooling fan 30 can blow out air from the rear side of the heating chamber 10. Further, the heating cooking apparatus 1 can more easily guide the blown air flow BF to each of the components to be cooled. As a result, the heating cooking apparatus 1 can more efficiently cool the components to be cooled.

As has been described with reference to FIG. 1A to FIG. 20, the cooling fan 30 includes a cross flow fan. The cross flow fan can take in air over a wide range in the right-and-left direction (horizontal direction) compared to a centrifugal air blower. Thus, the heating cooking apparatus 1 can efficiently take in air through the air intake hole parts 11BA, and can more efficiently cool the components to be cooled. The centrifugal air blower includes a sirocco fan.

In the above, an embodiment of the present disclosure has been described with reference to the drawings (FIG. 1A to FIG. 20). Note that the present disclosure is not limited to the embodiment described above, and can be carried out in the form of various aspects within the scope not departing from the gist of the present disclosure (for example, (1) to (15) described below). The drawings primarily schematically illustrate each of the constituent elements for the sake of easier understanding, and the thickness, length, number, and the like of each of the illustrated constituent elements are different from the actual thickness, length, number, and the like by reason of making of the drawings. Further, the material, shape, dimensions, and the like of each of the constituent elements illustrated in the embodiment described above are merely exemplary and are not particularly limiting, and various modifications can be made within the scope not departing from the effects of the present disclosure in essence.

(1) As has been described with reference to FIG. 1A to FIG. 20, in the present embodiment, the heating cooking apparatus 1 includes the panel 11. However, the present disclosure is not limited to this. The heating cooking apparatus need not include the panel 11.

(2) As has been described with reference to FIG. 1A to FIG. 20, in the present embodiment, the air discharge port 32b1 of the first duct member 32 is spaced apart from the exhaust hole parts 11C of the panel 11. However, the present disclosure is not limited to this. For example, the air discharge port 32b1 of the first duct member 32 may be in contact with the exhaust hole parts 11C of the panel 11.

(3) As has been described with reference to FIG. 1A to FIG. 20, in the present embodiment, the heating cooking apparatus 1 includes the second duct member 33. However, the present disclosure is not limited to this. The heating cooking apparatus 1 need not include the second duct member 33.

(4) As has been described with reference to FIG. 1A to FIG. 20, in the present embodiment, the heating cooking apparatus 1 includes the drawer body 13. However, the present disclosure is not limited to this. The heating cooking apparatus 1 need not include the drawer body 13. In this case, the heating cooking apparatus 1 may include a pivot door that is capable of opening and closing the opening part 11A. The pivot door is, for example, pivotable with respect to the heating chamber 10 and has an axis being a side on a lower side of the pivot door.

(5) As has been described with reference to FIG. 1A to FIG. 20, in the present embodiment, the heating cooking apparatus 1 includes the plurality of air deflecting dates 34. However, the present disclosure is not limited to this. The heating cooking apparatus 1 need not include the plurality of air deflecting plates 34.

(6) As has been described with reference to FIG. 1A to FIG. 20, in the present embodiment, the heating cooking apparatus 1 includes the grill unit 24. However, the present disclosure is not limited to this. The heating cooking apparatus need not include the grill unit 24.

(7) As has been described with reference to FIG. 1A to FIG. 20, in the present embodiment, the heating cooking apparatus 1 includes the first air sending unit 21 and the second air sending unit 22. However, the present disclosure is not limited to this. For example, the heating cooking apparatus 1 may include only one of the first air sending unit 21 and the second air sending unit 22, or may further include another air sending unit other than the first air sending unit 21 and the second air sending unit 22.

(8) As has been described with reference to FIG. 1A to FIG. 20, in the present embodiment, the heating cooking apparatus 1 includes the microwave supply unit 23. However, the present disclosure is not limited to this. The heating cooking apparatus 1 need not include the microwave supply unit 23.

(9) As has been described with reference to FIG. 1A to FIG. 20, in the present embodiment, the heating cooking apparatus 1 includes the partition plate 31. However, the present disclosure is not limited to this. The heating cooking apparatus need not include the partition plate 31. In this case, a part of the outer surface S10 of the heating chamber 10 and the inner surface S14 of the main body outer case 14 may come into contact with each other to form the air intake space AR and the exhaust space BR.

(10) As has been described with reference to FIG. 1A to FIG. 20, in the present embodiment, the air intake hole parts 11BA and the exhaust hole parts 11C are disposed to interpose the opening part 11A. However, the present disclosure is not limited to this. For example, the air intake hole parts 11BA and the exhaust hole parts 11C may be disposed on the same side with respect to the opening part 11A.

(11) As has been described with reference to FIG. 1A to FIG. 20, in the present embodiment, the air intake hole parts 11BA are disposed on a lower side of the opening part 11A and the exhaust hole parts 11C are disposed on an upper side of the opening part 11A. However, the present disclosure is not limited to this. For example, the air intake hole parts 11BA may be disposed on an upper side of the opening cart 11A, and the exhaust hole parts 210 may be disposed on a lower side of the opening part 11A. Further, the air intake hole parts 11BA may be disposed on a left side of the opening part 11A, and the exhaust hole parts 210 may be disposed on a right side of the opening part 11A.

(12) As has been described with reference to FIG. 1A to FIG. 20, in the present embodiment, the cooling fan 30 is located at the same height as the air intake hole parts 11BA. However, the present disclosure is not limited to this. The cooling fan 30 need not be located at the same height as the air intake hole parts 11BA.

(13) As has been described with reference to FIG. 1A to FIG. 20, in the present embodiment, the cooling fan 30 is located on a rear side of the heating chamber 10. However, the present disclosure is not limited to this. The cooling fan 30 need not be located on a rear side of the heating chamber 20.

(14) As has been described with reference to FIG. 1A to FIG. 20, in the present embodiment, a cross flow fan is used as the cooling fan 30. However, the present disclosure is not limited to this. For example, as the cooling fan 30, a centrifugal fan may be used, or a compressor may be used. Further, in the present embodiment, as the cooling fan 30, two cross flow fans are used. However, the present disclosure is not limited to this. For example, as the cooling fan 30, only one cross flow fan may be used, or three or more cross flow fans may be used.

(15) As has been described with reference to FIG. 1A to FIG. 20, in the present embodiment, the cooling fan 30 is disposed on a rear side of the heating chamber 10 and on a lower side of the heating chamber 10. However, the present disclosure is not limited to this. For example, the cooling fan 30 may be disposed on a rear side of the heating chamber 10 and on an upper side of the heating chamber 10. In this case, the shape of the partition plate 31 may be adjusted in order to form the air intake space AR.

INDUSTRIAL APPLICABILITY

The present disclosure is useful in the field of a heating cooking apparatus, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A heating cooking apparatus comprising:
  a heating chamber internally including a heating cooking chamber in which an object to be heated is accommodated;
  a main body outer case configured to accommodate the heating chamber;
  a cooling fan disposed in a first space, the first space being formed between an outer surface of the heating chamber and an inner surface of the main body outer case;
  a first duct member attached to the outer surface of the heating chamber; and
  a hot air sending unit comprising an air sending chamber and a heater within the air sending chamber, and configured to supply hot air to the heating cooking chamber, wherein:

the first duct member separates blown air flow blown out from the cooling fan into a first air flow and a second air flow, the first air flow comprises an air flow generated by the cooling fan that flows inside the first duct member to cool down the air sending chamber, and the second air flow comprises an air flow generated by the same cooling fan that flows outside the first duct member to cool down other components of the heating cooking apparatus.

2. The heating cooking apparatus according to claim 1, further comprising:

a panel disposed on a front side of the heating chamber and including a through hole part, wherein:

the through hole part is located downstream of the blown air flow with respect to the cooling fan, the through hole part connects the first space with an outside of the heating cooking apparatus with each other, the first duct member includes an air discharge port configured to discharge the first air flow, and the air discharge port is spaced apart from the through hole part.

3. The heating cooking apparatus according to claim 1, further comprising:

an operation panel part disposed on a front side of the heating chamber; and a second duct member disposed in a second space, the second space being formed between the inner surface of the main body outer case and an outer surface of the first duct member, wherein:

the operation panel part includes:

a control unit configured to control the hot air sending unit and the cooling fan, and an accommodation chamber configured to accommodate the control unit, the second duct member guides a third air flow, which is part of the second airflow, toward the accommodation chamber, and the accommodation chamber includes;

an air introduction hole part configured to cause the third air flow to be blown into the accommodation chamber, and an air discharge hole part configured to discharge the third air flow to an outside of the heating cooking apparatus from an inside of the accommodation chamber.

4. The heating cooking apparatus according to claim 1, further comprising:

a drawer body freely drawable in a front-and-rear direction with respect to the heating chamber;

a slide rail attached to the outer surface of the heating chamber and being configured to support the drawer body to be freely slidable along the front-and-rear direction; and an air deflecting plate for the slide rail configured to guide the second air flow to the slide rail, wherein the drawer body includes a slide member supported to be freely slidable along the slide rail.

5. The heating cooking apparatus according to claim 1, further comprising:

a grill unit configured to supply heat to the heating cooking chamber; and an air deflecting plate for the grill unit attached to the outer surface of the heating chamber, wherein the grill unit includes:

a heater unit for heating and cooking located at an upper portion in the heating cooking chamber, and an energization unit projecting from the outer surface of the heating chamber and being configured to energize the heater unit for the heating and cooking, and the air deflecting plate for the grill unit guides the second air flow to the energization unit.

6. The heating cooking apparatus according to claim 1, wherein the hot air sending unit includes a first hot air sending unit and a second hot air sending unit.

7. The heating cooking apparatus according to claim 1, further comprising:

a microwave supply unit configured to supply microwaves to the heating cooking chamber.

\* \* \* \* \*